United States Patent
Miyamura et al.

(10) Patent No.: US 6,726,323 B2
(45) Date of Patent: Apr. 27, 2004

(54) CONTACT LENS AND METHOD OF DESIGNING THE SAME

(75) Inventors: Kazuya Miyamura, Kasugai (JP); Tadashi Sawano, Ama-gun (JP); Arata Kouzai, Suzuka (JP); Kiyosei Kondo, Tsushima (JP)

(73) Assignee: Menicon Co., Ltd., Nagayo (JP)

( * ) Notice: Subject to any disclaimer, the term of this patent is extended or adjusted under 35 U.S.C. 154(b) by 0 days.

(21) Appl. No.: 10/307,072

(22) Filed: Nov. 29, 2002

(65) Prior Publication Data

US 2003/0103187 A1 Jun. 5, 2003

(30) Foreign Application Priority Data

Nov. 30, 2001 (JP) .......................... 2001-367231
Nov. 26, 2002 (JP) .......................... 2002-341644

(51) Int. Cl.$^7$ ............................... G02C 7/04
(52) U.S. Cl. .................... 351/160.4; 351/177
(58) Field of Search .................. 351/160 R, 160 H, 351/161, 162, 177

(56) References Cited

U.S. PATENT DOCUMENTS

| | | | |
|---|---|---|---|
| 4,580,882 A | 4/1986 | Nuchman et al. | ............ 351/161 |
| 4,761,069 A | 8/1988 | Truong et al. | ............ 351/160 H |
| 4,948,245 A | 8/1990 | Seger et al. | ............ 351/160 H |
| 5,214,453 A * | 5/1993 | Giovanzana | ............ 351/161 |
| 5,278,592 A | 1/1994 | Marie et al. | ............ 351/160 R |
| 6,325,509 B1 | 12/2001 | Hodur et al. | ............ 351/160 R |

FOREIGN PATENT DOCUMENTS

| | | |
|---|---|---|
| EP | 0742462 A2 | 11/1996 |
| JP | 8-286155 | 11/1996 |
| JP | 11-52304 | 2/1999 |
| JP | 2000-214417 | 8/2000 |

OTHER PUBLICATIONS

European Search Report, dated Mar. 18, 2003.

\* cited by examiner

*Primary Examiner*—Scott J. Sugarman
(74) *Attorney, Agent, or Firm*—Beyer Weaver & Thomas, LLP

(57) ABSTRACT

A contact lens wherein a dioptric power P is held within a range of −10–0 diopters, a back junction is located outward of a front junction in a diametric direction orthogonal to a center axis of the lens, a central lens thickness $T_C$ measures 0.03–0.50 mm along the center axis, a front junction lens thickness $T_{FJ}$ measures 0.05 mm or more, and a back-junction lens thickness $T_{BJ}$ is determined depending upon said dioptric power P so as to satisfy a following expression:

$$\Sigma(A_i \cdot 10^{-i} \cdot P^i) \leq T_{BJ}/T_{FJ} \leq \Sigma(B_i \cdot 10^{-i} \cdot P^i)$$

where,
$A_0 = +1.2382$
$A_1 = -0.1741$
$A_2 = -1.4711$
$A_3 = -0.9355$
$B_0 = +1.4699$
$B_1 = -0.2523$
$B_2 = -1.9897$
$B_3 = -1.2603$.

34 Claims, 12 Drawing Sheets

CONTACT LENS AND METHOD OF DESIGNING THE SAME

INCORPORATED BY REFERENCE

The disclosure of Japanese Patent Application No. 2001-367231 filed on Nov. 30, 2001, and No. 2002-341644 filed on Nov. 26, 2002, each including the specification, drawings and abstract is incorporated herein by reference in its entirety.

BACKGROUND OF THE INVENTION

1. Field of the Invention

The present invention relates generally to a contact lens and a method of designing the same, and is concerned with techniques for providing a contact lens that is satisfactory in shape stability and that is thin and comfortable to wear. More particularly, the present invention is concerned with a novelly shaped contact lens suitably applicable to soft contact lenses, and capable of establishing an easiness of handling and an easiness of differentiating between a front surface and a back surface thereof with the help of its shape stability, while ensuring its suitable wearing comfort as felt by a lens wearer. The present invention is also concerned with a novel method of designing the contact lens.

2. Description of the Related Art

Generally, contact lenses require to be excellent in (a) lens wearing comfort as felt by a lens wearer, and to be easy of (b) handling by fingers of the lens wearer. In order to improve the former requirement, i.e., the lens wearing comfort, it is desirable to sufficiently reduce a thickness of a contact lens (hereinafter referred to as a "lens thickness" where appropriate) while assuring a minimum lens thickness determined by a selected lens material, with production efficiency and durability of the contact lens taken into consideration. Such a thin contact lens is also excellent in oxygen permeability. The thin contact lens, however, may be deteriorated in its shape stability. In the case of a thin soft contact lens, particularly, it is likely that the soft contact lens, when being placed on a finger of the lens wearer to be worn on or removed from a cornea, clings to a surface of the finger of the lens wearer. This makes it difficult to handle the contact lens by the fingers and to differentiate between a front surface and a back surface of the contact lens, resulting in cumbersome operations in wearing and removal of the contact lens.

To cope with these problems, a number of solutions have been suggested. For instance, a lens thickness of a contact lens is increased by an amount enough to ensure a good handling thereof based on its good shape stability. Alternatively, an identification mark is provided on a surface of the contact lens for allowing the wearer to differentiate between the front surface and the back surface of the contact lens. The latter one enables the contact lens to be made thin with a great regard for the lens wearing comfort, while coping with the problem of insufficiency in the shape stability of the contact lens. However, these solutions are still in a level of compromises in which any one of the wearing comfort and the shape stability (or the handling of the contact lens) is sacrificed or ignored, and are not what can be called fundamental solutions. In particular, a number of specific manufacturing process and workings are needed to form the identification mark on the surface of the contact lens, undesirably pushing a manufacturing cost.

In order to achieve both of the excellent lens wearing comfort and the good handling of the contact lens, JP-A-8-286155 discloses a contact lens design wherein a peripheral zone has a lens thickness of not less than 1.2 times a lens thickness as measured at a central portion of the lens, and a front junction of an optical zone with a peripheral zone on a front surface (or a front curve surface) of the lens is offset radially outwardly from a back junction of an optical zone with a peripheral zone on a back surface (or a base curve surface) of the lens, so as to increase the thickness of the peripheral zone. Further, JP-A-11-52304 and JP-A-2000-214417 disclose another contact lens design wherein there are determined a lens thickness as measured at its central portion and a lens thickness at and a position of a part of a peripheral portion where the thickness dimension is maximized.

These contact lens designs disclosed in the above-indicated documents are unsatisfactory in achieving both of the lens wearing comfort and good handling of the contact lens. In this respect, these conventional contact lens designs are basically concerned with the lens thickness as measured at around the front junction on the front surface of the contact lens where the optical zone and the peripheral zone join together, and determine the lens thickness at around the front junction to be made larger enough to exhibit its good shape stability, but not cause considerable deterioration of the lens wearing comfort as felt by the wearer. The increase in the lens thickness at around the front junction inevitably restricts a design of optical characteristics of the optical zone, resulting in a relatively low degree of freedom in designing lens forms and powers.

Upon designing a contact lens, generally, a radius of curvature of a back surface of the lens is determined as a base curve to approximately correspond to a shape of a surface of the cornea of the lens wearer so that the contact lens is comfortable to wear and is positioned on the cornea with high stability. Then, a front surface of the lens is designed so as to give a desirable optical power to an optical zone of the lens, and so as to permit the optical zone to have a minimum thickness of the lens determined by selected materials. Since the lens thickness as measured at around an outer peripheral portion of a front optical zone of the contact lens is dimensioned to a specific value, according to the above-described documents, the thickness of the optical zone is entirely restricted or affected by the thickness of the outer peripheral portion of the optical zone, thus limiting a degree of freedom in designing the contact lens and a power of the lens.

SUMMARY OF THE INVENTION

It is therefore an object of the invention to provide a contact lens which is novel in configuration and which is capable of highly ensuring both of lens wearing comfort and shape stability, while providing a high degree of freedom in designing the contact lens.

It is another object of the present invention to provide a novel method of designing such a contact lens.

The above and/or optical objects of this invention may be attained according to at least one of the following modes of the invention. Each of those modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A contact lens comprising: a central optical zone including a front optical zone and a back optical zone; and a peripheral zone surrounding the optical zone and including a front peripheral zone and a back peripheral zone, wherein the contact lens is provided with a dioptric power P ranging from −10 to 0 diopters (−10≦P≦0), wherein the front optical zone and the front peripheral zone join together at a front junction, and the back optical zone and the back peripheral zone join together at a back junction that is located outward of the front junction in a diametric direction of the contact lens orthogonal to a center axis of the contact lens, and wherein the contact lens has a central lens thickness $T_C$ ranging from 0.03 to 0.50 mm as measured along the center axis thereof, a front junction lens thickness $T_{FJ}$ of not less than 0.05 mm as measured at the front junction, and a back-junction lens thickness $T_{BJ}$ as measured at the back junction, the back-junction lens thickness $T_{BJ}$ is determined depending upon the dioptric power P so as to satisfy a following expression:

$$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.2382
$A_1$=−0.1741
$A_2$=−1.4711
$A_3$=−0.9355
$B_0$=+1.4699
$B_1$=−0.2523
$B_2$=−1.9897
$B_3$=−1.2603

In order to accomplish this mode of the invention, an extensive analysis or study was made by the inventors on their new finding that a shape stability of a contact lens owing to an optical zone varies depending upon a shape of a front surface of the contact lens that is determined by a dioptric power of the lens. A result of the analysis has revealed that when the front junction and the back junction are spaced away from each other in the diametric direction orthogonal to the center axis of the lens, a suitable adjustment of a ratio $T_{BJ}/T_{FJ}$ of the back junction lens thickness $T_{BJ}$ to the front junction lens thickness $T_{FJ}$ depending upon the dioptric power P of the lens makes it possible to effectively ensure a desired shape stability of the contact lens at the optical zone. In this respect, the ratio $T_{BJ}/T_{FJ}$ is adjusted to meet the specific condition as represented by the expression depending upon the dioptric power of the optical zone, thus making it possible to provide the contact lens that is well comfortable to wear and is fully satisfactory in its shape stability. This mode of the present invention has been accomplished based on the above-described knowledge of the present inventors.

According to this mode of the invention, moreover, the back junction formed between the back optical zone and the back peripheral zone is located radially outward of the front junction formed between the front optical zone and the front peripheral zone with a radial spacing therebetween. This arrangement makes it possible to adjust the ratio $T_{BJ}/T_{FJ}$, which is determined depending upon the dioptric power of the lens, by only shifting a position of the back junction relative to the front junction. In other words, this arrangement makes it possible to improve the shape stability of the contact lens to a required level by suitably adjusting the back junction lens thickness, while desirably determining the front junction lens thickness $T_{FJ}$ in order to establish required optical characteristics in the optical zone of the lens, and while eliminating adverse effect on the optical characteristics of the optical zone.

The central lens thickness $T_C$ of the contact lens is held within a range of 0.03–0.50 mm, more preferably 0.05–0.50 mm, while the front junction lens thickness $T_{FJ}$ where the front optical zone and the front peripheral zone join together is not smaller than 0.05 mm more preferably not smaller than 0.10 mm. This arrangement enables the contact lens to have the approximately same form and lens thickness in its optical zone, depending upon its dioptric power, thus making it possible to systematically and accurately recognize shape stability generated in the optical zone based on the dioptric power of the contact lens. Therefore, shape stability to be generated in the peripheral zone can be determined while taking into account the shape stability of the optical zone, thus enabling the contact lens to stably establish a desired shape stability in its entirety, which is enough to ensure a good handling of the contact lens.

Therefore, the contact lens constructed according to this mode of the invention can effectively establish a preferable shape stability in its entirety that is determined with the shape stability of the optical zone taken into consideration, thus eliminating the conventionally experienced problems that an excessively large lens thickness causes an excessively increased shape stability of the lens and a resultant deterioration in lens wearing comfort, and adverse effects on optical characteristics of the lens. For this reason, the contact lens according to this mode of the invention is superiorly comfortable to wear and excellent in handling as well.

A type and a material of the contact lens according to this mode of the invention are not particularly limited, and the principle of the present mode of the invention may be applicable to various types of known contact lenses including contact lenses for treating myopia, presbyopia, and astigmatism. The term "lens thickness" should be interpreted to mean a thickness of a contact lens measured in a radial direction at an optional measuring point. In the case where a contact lens has a spherical back optical zone, the lens thickness of the contact lens is defined by a thickness of the lens as measured along a straight line extending through a center of the spherical back optical zone and a measuring point, for example. In the case where a contact lens has an aspherical back optical zone, the lens thickness is defined by a thickness of the lens as measured along a straight line including a center of a vertex sphere as a starting point. The reasons why the present mode of the invention is directed to contact lenses having dioptric powers within a range of −10–0 diopters (−10≦P≦0) are that a great demand exists for these contact lenses usable for treating myopia, and that these contact lenses can be supplied to the market as a design family of contact lenses whose dioptric powers vary from one another at given equal intervals.

(2) A contact lens comprising: a central optical zone including a front optical zone and a back optical zone; and a peripheral zone surrounding the optical zone and including a front peripheral zone and a back peripheral zone, wherein the contact lens is provided with a dioptric power P ranging from −6 to 0 diopters (−6≦P≦0), wherein the front optical zone and the front peripheral zone join together at a front junction, and the back optical zone and the back peripheral zone join together at a back junction that is located outward of the front junction in a diametric direction of the contact lens orthogonal to a center axis of the contact lens, and wherein the contact lens has a central lens thickness $T_C$ ranging from 0.03 to 0.50 mm, more preferably 0.05 to 0.50 mm, as measured along the center axis thereof, a front junction lens thickness $T_{FJ}$ of not less than 0.05 mm as measured at the front junction between the front optical zone and the front peripheral zone, and a back-junction lens thickness $T_{BJ}$ as measured at the back junction is determined so as to satisfy a following expression:

$$T_{BJ}/T_{FJ} \geq 1$$

Like the above-indicated mode (1) of the invention, the principle of this mode of the invention has been accomplished as a result of the extensive analysis or study conducted by the inventors based on the technical concept that a suitable adjustment of the ratio $T_{BJ}/T_{FJ}$ of the back junction lens thickness $T_{BJ}$ to the front junction lens thickness $T_{FJ}$ depending upon the dioptric power of the lens permits the contact lens to effectively establish its overall shape stability, while eliminating the problem of deterioration of the lens wearing comfort due to the excessive enlargement of the lens thickness. More particularly, the principle of this mode of the invention has been developed based on a new finding that the contact lens provided with the dioptric power P ranging from −6 to 0 diopters ($-6 \leq P \leq 0$) may suffer from difficulty in exhibiting an effective shape stabilizing characteristics or capability in its optical zone, when being provided with a suitable form and thickness at its optical zone. The reasons why the present mode of the invention is directed to contact lenses having dioptric powers within a range of −6–0 diopters ($-6 \leq P \leq 0$) are that a great demand exists for these contact lenses usable for treating myopia, and that the present inventors have paid their attention to a new finding that the contact lenses having dioptric powers within a range of −6–0 diopters, among the contact lenses having the dioptric powers within a range of −10–0 diopters ($-10 \leq P \leq 0$), especially suffer from their common difficulty in establishing a desired shape stability in their optical zones. Described in detail, in each of the contact lenses having the dioptric powers ranging from −6 to 0 diopters, the optical zone has a relatively small difference between its minimum thickness and its maximum thickness, so that the optical zone is capable of ensuring a lens wearing comfort, but is incapable of exhibiting a desired shape stability, if the minimum thickness of the optical zone is set to a minimum value required for ensuring strength and durability of the contact lens.

In the contact lens constructed according to this mode of the invention, the back junction lens thickness $T_{BJ}$ as a lens thickness measured at the back junction is made larger than the front junction lens thickness $T_{FJ}$ as a lens thickness measured at the front junction, while the optical zone is desirably designed in terms of its shape and a thickness dimension. While the desirably shaped optical zone of the contact lens is prone to be insufficient in its shape stability, the peripheral zone of the contact lens where the lens thickness is made larger at the back junction rather than at the front junction, can effectively compensate the insufficient shape stability of the contact lens. Thus, the contact lens of this mode of the invention is able to establish a desired shape stability in its entirety and a resultant good handling thereof, while being highly satisfactory in terms of its optical characteristics and its wearing comfort with the help of a reduced thickness of the optical zone. In this respect, an upper limit of the ratio $T_{BJ}/T_{FJ}$ is determined while taking into account lens wearing comforts as felt by lens wearers, and a variation in sensitivities or the like of individual wearers. In general, the front and back junction lens thicknesses $T_{FJ}$, $T_{BJ}$ have respective minimum values restricted by required lens strength and durability varying depending upon a material of the contact lens, and respective maximum values restricted by the lens wearing comfort not to be larger than 1.0 mm. For this reason, there is no need to especially consider the upper limit of the ratio $T_{BJ}/T_{FJ}$.

(3) A contact lens according to the above-indicated mode (1) or (2), wherein the front junction has a diameter within a range of 55–85% of a diameter of the contact lens, and the back junction has a diameter within a range of 70–90% of the diameter of the contact lens. Upon setting a variety of dioptric power of the contact lens, this arrangement ensures the contact lens to establish a desired shape stability in its entirety, since one or both of the shape stabilities exhibiting in the optical zone and the peripheral zone can be compensated by the other or with each other.

(4) A contact lens comprising: a central optical zone including a front optical zone and a back optical zone; and a peripheral zone surrounding the optical zone and including a front peripheral zone and a back peripheral zone, wherein the contact lens is provided with a dioptric power P not larger than −10 diopters (P<−10), wherein the front optical zone and the front peripheral zone join together at a front junction, and the back optical zone and the back peripheral zone join together at a back junction that is located outward of the front junction in a diametric direction of the contact lens orthogonal to a center axis of the contact lens, and wherein the contact lens has a central lens thickness $T_C$ ranging from 0.03 to 0.50 mm as measured along the center axis thereof, a front junction lens thickness $T_{FJ}$ of not less than 0.05 mm as measured at the front junction, and a back-junction lens thickness $T_{BJ}$ as measured at the back junction, the back-junction lens thickness $T_{BJ}$ is determined depending upon the dioptric power P so as to satisfy a following expression:

(a) where the front optical zone has a diameter $D_{FOZ}$ of smaller than 7.0 mm ($D_{FOZ}$<7.0 mm), $$0.877 \leq T_{BJ}/T_{FJ} \leq 0.993$$

(b) where the front optical zone has a diameter $D_{FOZ}$ of not smaller than 7.0 mm ($D_{FOZ} \geq 7.0$ mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.7980
$A_1$=+1.4330
$A_2$=+0.5824
$A_3$=+0.0814
$B_0$=+2.0184
$B_1$=+1.5827
$B_2$=+0.6298
$B_3$=+0.0871

According to this mode of the invention, a so-called "high-minus lens" provided with a negative refractive power larger than −10 diopters can exhibit an excellent shape stability in its entirety, like in the above-indicated mode (1), since a shape stability generated in the optical zone can be recognized and effectively compensated by a shape stability generated in the peripheral zone with the recognized shape stability of the optical zone utilized. In addition, the peripheral zone is shaped so as to meet specific conditions selected based on the dioptric power given to the optical zone, thus making it possible to establish the excellent shape stability of the contact lens, while assuring a sufficient degree of freedom in designing the optical characteristics of the optical zone, and an excellent lens wearing comfort.

It should be appreciated that the peripheral zone is shaped with the diameter $D_{FOZ}$ of the front optical zone taken into consideration, making it possible to suitably compensate the shape stability generated in the optical zone by the peripheral zone with the help of the accurate recognition of the shape stability in the optical zone, without causing an excessive increase in the thickness of the peripheral zone. Thus, the contact lens constructed according to this mode of the invention is capable of exhibiting the excellent shape stability in its entirety and the excellent lens wearing comfort, as well. More specifically described, in the case where the optical zone of the contact lens has a relatively large diameter $D_{FOZ}$, the thickness of a peripheral portion of the optical zone is inevitably made large sufficiently, since the negative refractive power given to the optical zone is great. Thus, the contact lens can be designed so as to exhibit its entire shape stability by utilizing the shape stability eventually generated in the optical zone, and so as to establish the excellent lens wearing comfort without needing the excessive increase in the thickness of the peripheral zone, which is likely to be caused. In the case where the optical zone of the contact lens has a relatively small diameter $D_{FOZ}$, on the other hand, the contact lens can be designed such that a tendency of lacking in the shape stability generated in the optical zone can be compensated by the peripheral zone.

(5) A contact lens comprising: a central optical zone including a front optical zone and a back optical zone; and a peripheral zone surrounding the optical zone and including a front peripheral zone and a back peripheral zone, wherein the contact lens is provided with a dioptric power P larger than 0 diopters (0<P), wherein the front optical zone and the front peripheral zone join together at a front junction, and the back optical zone and the back peripheral zone join together at a back junction that is located outward of the front junction in a diametric direction of the contact lens orthogonal to a center axis of the contact lens, and wherein the contact lens has a central lens thickness $T_C$ ranging from 0.03 to 0.50 mm as measured along the center axis thereof, a front junction lens thickness $T_{FJ}$ of not less than 0.05 mm as measured at the front junction, and a back-junction lens thickness $T_{BJ}$ as measured at the back junction, the back-junction lens thickness $T_{BJ}$ is determined depending upon the dioptric power P so as to satisfy a following expression:
(a) where the front optical zone has a diameter $D_{FOZ}$ of smaller than 7.0 mm ($D_{FOZ}$<7.0 mm), $$1.238 \leq T_{BJ}/T_{FJ} \leq 1.470$$

(b) where the front optical zone has a diameter $D_{FOZ}$ of not smaller than 7.0 mm ($D_{FOZ} \geq 7.0$ mm), $$\Sigma(A_i \cdot 10^{-1} \cdot P^i) \leq T_{BJ}/T_{FJ} \leq \Sigma(B_i \cdot 10^{-i} \cdot P^i)$$

where,
$A_0$=+1.2066
$A_1$=−0.0398
$A_2$=−0.1341
$A_3$=+0.0139
$B_0$=+1.4328
$B_1$=−0.0516
$B_2$=−0.1436
$B_3$=+0.0153

According to this mode of the invention, a so-called "plus lens" provided with a positive refractive power larger than 0 diopter can exhibit an excellent shape stability in its entirety, like in the above-indicated mode (1), since the shape stability generated in the optical zone can be recognized and effectively compensated by the shape stability generated in the peripheral zone with the recognized shape stability in the optical zone utilized. In addition, the peripheral zone is shaped so as to meet specific conditions selected based on the dioptric power given to the optical zone, thus making it possible to establish the excellent shape stability of the contact lens, while assuring a sufficient degree of freedom in designing the optical characteristics of the optical zone, and an excellent lens wearing comfort.

It should be appreciated that the peripheral zone is shaped with the diameter $D_{FOZ}$ of the front optical zone taken into consideration, like in the above-indicated mode (2), making it possible to suitably arrange the shape stability generated in the peripheral zone depending upon the shape stability generated in the optical zone, permitting the contact lens to exhibit both of the excellent shape stability and lens wearing comfort in its entirety. More specifically described, in the case where the optical zone of the contact lens has a relatively large diameter $D_{FOZ}$, the thickness of a central portion of the optical zone is inevitably made larger sufficiently, since the positive refractive power given to the optical zone is great. Thus, the contact lens can be designed so as to exhibit its entire shape stability by effectively utilizing the shape stability generated in the optical zone, and so as to establish the excellent lens wearing comfort without needing the excessive increase in the thickness of the peripheral zone, which is likely to be caused. In the case where the optical zone of the contact lens has a relatively small diameter $D_{FOZ}$, on the other hand, the contact lens can be designed such that a tendency of lacking in the shape stability generated in the optical zone can be compensated by the peripheral zone.

(6) A contact lens according to any one of the above indicated modes (1)–(5), wherein at least one of the front junction and the back junction is formed by a connecting surface joined to the optical zone along junctions lying on tangents common to curves of the optical zone and the connecting surface, and to the peripheral zone along junctions lying on tangents common to curves of the peripheral zone and the connecting surface, as seen in diametrical cross section, the connecting surface being a smoothly continuous surface interposed between the optical zone and the peripheral zone and lying on tangents whose slopes are continuously changed over an entire width thereof. According to this mode of the invention, at least one of the front surface and the back surface of the contact lens is arranged such that the optical zone and the peripheral zone can smoothly join together at their junction with the help of the connecting surface interposed therebetween with a given radial width, although the optical zone and the peripheral zone are provided with different shapes in diametrical cross section so as to meet their different optical characteristics, respectively. Thus, the presence of the connecting surface makes it possible to smoothly join the optical zone and the peripheral zone together with no adverse influence on the shape or the optical characteristics of the optical zone and the peripheral zone, thereby effectively eliminating a possible problem of deterioration in lens wearing comfort due to an edge or angle formed at the junction between the optical zone and the peripheral zone on the at least one of the front and back surfaces of the contact lens.

The contact lens of the present invention may have the following structure other than the structure defined by the above-indicated mode (6) for a smooth connection between the optical zone and the peripheral zone. In the case where the peripheral zone of the contact lens has a relatively high degree of freedom in its shape design, at least one of the front and back surfaces of the contact lens is arranged such that an inner circumferential edge of the peripheral zone is shaped to have an angle value equal to an angle value of an outer circumferential edge of the optical zone. This arrangement permits at least one of the front and back surfaces of the contact lens that the optical zone and the peripheral zone directly and smoothly join together along junctions lying on tangents common to curves of the optical zone and the peripheral zone. The contact lens constructed as described above can provide a further improved lens wearing comfort as felt by the lens wearer, like in the above-indicated mode (6) of the invention.

(7) A contact lens according to any one of the above-indicated modes (1)–(6), wherein the front peripheral zone has a diametrical cross sectional shape represented by at least one of a polynomial of not less than second order, a conic section and a spline curve. According to this mode of the invention, the front peripheral zone can be designed to be a smooth surface with a high degree of freedom. This makes it possible to easily shape the front peripheral zone of the contact lens, for example, such that the front peripheral zone is joined to the front optical zone along junctions lying on tangents common to curves of the front optical zone and the front peripheral zone, and is smoothly joined to an outermost edge of the contact lens, while permitting the contact lens to have a desired lens thickness as measured at the back junction where the back optical zone and the back peripheral zone join together.

(8) A contact lens according to any one of the above-indicated modes (1)–(7) wherein the back peripheral zone at least partially has an arcuate shape in diametrical cross section. This arrangement permits a relatively easy designing of the back peripheral zone of the contact lens. Preferably, the back peripheral zone is designed to have a radius of curvature larger than that of the back optical zone. In this respect, the back peripheral zone may consist of at least two parts that have arcuate forms in diametrical cross section with different radius of curvatures, and that join together in the radial direction of the contact lens. In this respect, the radius of curvature of the radially outer one of the two parts of the back peripheral zone is preferably made larger than that of the radially inner one of the two parts of the back peripheral zone.

(9) A contact lens according to any one of the above-indicated modes (1)–(8), wherein the contact lens comprises a soft contact lens formed of a soft material. According to this mode of the invention, the principle of the present invention is applied to a soft contact lens, so that the soft contact lens is accurate in its dioptric power, thin enough to assure a high gas permeability, and is able to effectively establish its shape stability that has been widely required. The soft contact lens of this mode of the invention can eliminate the conventionally experienced problem that a soft contact lens, when being placed on a finger of the lens wearer for wearing the contact lens, clings to a surface of the finger of the lens wearer. Therefore, the soft contact lens of this mode of the invention is excellent in its handling and easy to differentiate between the front surface and the back surface of the contact lens.

All of the above-described modes (1)–(8) of the invention may be applicable not only to a variety of soft contact lenses of high, medium and low hydrophilic types but to hydrophobic or hard contact lenses as well. These contact lenses according to any one of the above-indicated modes (1)–(8) of the invention can be provided with a relatively small lens thickness, each being satisfactory in its strength and deformation stability in its entirety, whereby these contact lenses can satisfactory provide required optical characteristics and can improve lens wearing comfort and handling, and their overall strength.

(10) A method of designing a contact lens including: a central optical zone having a front optical zone and a back optical zone; and a peripheral zone surrounding the optical zone and having a front peripheral zone and a back peripheral zone, the method comprising the steps of: positioning a back junction where the back optical zone and back peripheral zone join together is located radially outward of a front junction where the front optical zone and the front peripheral zone join together; and adjusting a ratio $T_{BJ}/T_{FJ}$ of a back junction lens thickness $T_{BJ}$ to a front junction lens thickness $T_{FJ}$ to be held within a tolerable range predetermined depending upon a dioptric power P provided to the optical zone.

This method of designing a contact lens has been accomplished based on the technical concept as described above with respect to a contact lens according to the present invention. Namely, the back junction where the back optical zone and the back peripheral zone join together is located radially outward of the front junction where the front optical zone and the front peripheral zone join together and the lens thickness at the back junction is suitably adjusted, thus making it possible to establish a desirable shape stability of the contact lens with no adverse influence on the optical characteristics of the contact lens. It should be noted that the configuration of the contact lens is determined based on the dioptric power of the optical zone. This makes it possible to compensate the shape stability at the optical zone by enhancing the shape stability at the peripheral zone, when the shape stability of the optical zone is considered to be insufficient. Accordingly, the present method makes it possible to effectively and easily design a desired lens configuration that allows the contact lens to exhibit desired shape stability in its entirety with a relatively small lens thickness, by adjusting a shape stability generated in the peripheral zone depending upon a shape stabilizing effect generated in the optical zone, with required optical characteristics of the optical zone provided highly precisely.

That is, the method according to this mode of the invention makes it possible to easily provide a contact lens that is remarkably improved both in its handling and wearing comfort while maintaining its accurate optical characteristics. This method may preferably be usable for designing a variety of soft contact lenses of high, medium and low hydrous types, and for designing hard contact lenses as well, thereby allowing each obtained contact lens to be improved in its wearing comfort and its overall handling and strength, while being satisfactory in its optical characteristics.

(11) A method of designing a contact lens according the above-indicated mode (10), further comprising the step of designing a form of the optical zone such that a central lens thickness measured along a center axis of the contact lens is held within a range of 0.03–0.50 mm, more preferably 0.05–0.50 mm, and a peripheral lens thickness measured at the front junction is not less than 0.05 mm, more preferably, 0.10 mm. This method makes it possible to more sufficiently achieve both requirements, i.e., the thinned optical zone and the lens shape stability.

(12) A method of designing a contact lens according to the above-indicated mode (10) or (11), wherein when a dioptric power P is held within a range from 0 diopter to −6 diopters, the ratio of $T_{BJ}/T_{FJ}$ is adjusted according to a condition expression that a ratio of the back-junction lens thickness $T_{BJ}$ to the front-junction lens thickness $T_{FJ}$ is held within a tolerable range of not less than 1. As discussed above with respect to the above-indicated mode (2), when the contact lens has a dioptric power ranging from 0 diopter to −6 diopters, the optical zone is likely to be insufficient in its shape stabilizing effect so as to be suitably designed in its shape and thickness. This insufficient shape stability generated in the optical zone can be compensated with the shape stability generated in the peripheral zone. Thus, the present method easily permits a design of the contact lens that is excellent in handling with the help of the excellent shape stability in its entirety, while highly ensuring desired optical characteristics of the optical zone and a lens wearing comfort with the help of a relatively thin lens thickness.

(13) A method of designing a contact lens according to any one of the above indicted modes (10)–(12), wherein the tolerable range of the ratio $T_{BJ}/T_{FJ}$ of the back-junction lens thickness $T_{BJ}$ to the front-junction lens thickness $T_{FJ}$ comprises options represented by the expressions with respect to the ratio $T_{BJ}/T_{FJ}$ recited in the above indicated modes (1),(3) and (4), selectable depending upon the dioptric power P given to the optical zone and the diameter $D_{FOZ}$ of the optical zone. The present method of this mode of the invention makes it possible to design and provide contact lenses constructed according to the present invention and capable of exhibiting a variety of excellent technical effects or advantages of the invention.

The contact lens designed according to any one of the above-indicated method of the invention, may be manufactured according to any known methods of producing contact lenses, which may be selected with a material and a dioptric power of the lens taken into consideration. For instance, the contact of the present invention may be formed of polymer by cutting and polishing, or alternatively may be manufactured by injecting and polymerizing a monomer composition in a mold having a mold cavity whose form corresponds to a desired form of the contact lens. Also, the contact lens of the invention may be manufactured by forming one of opposite surfaces thereof upon polymerizing a material in a suitable mold cavity and by cutting and polishing the other surface thereof. Further, the contact lens of the invention may be formed by spin casting wherein a monomer composition is injected into a rotatable mold and shaped by utilizing an effect of a centrifugal force.

BRIEF DESCRIPTION OF THE DRAWINGS

The forgoing and/or optional objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
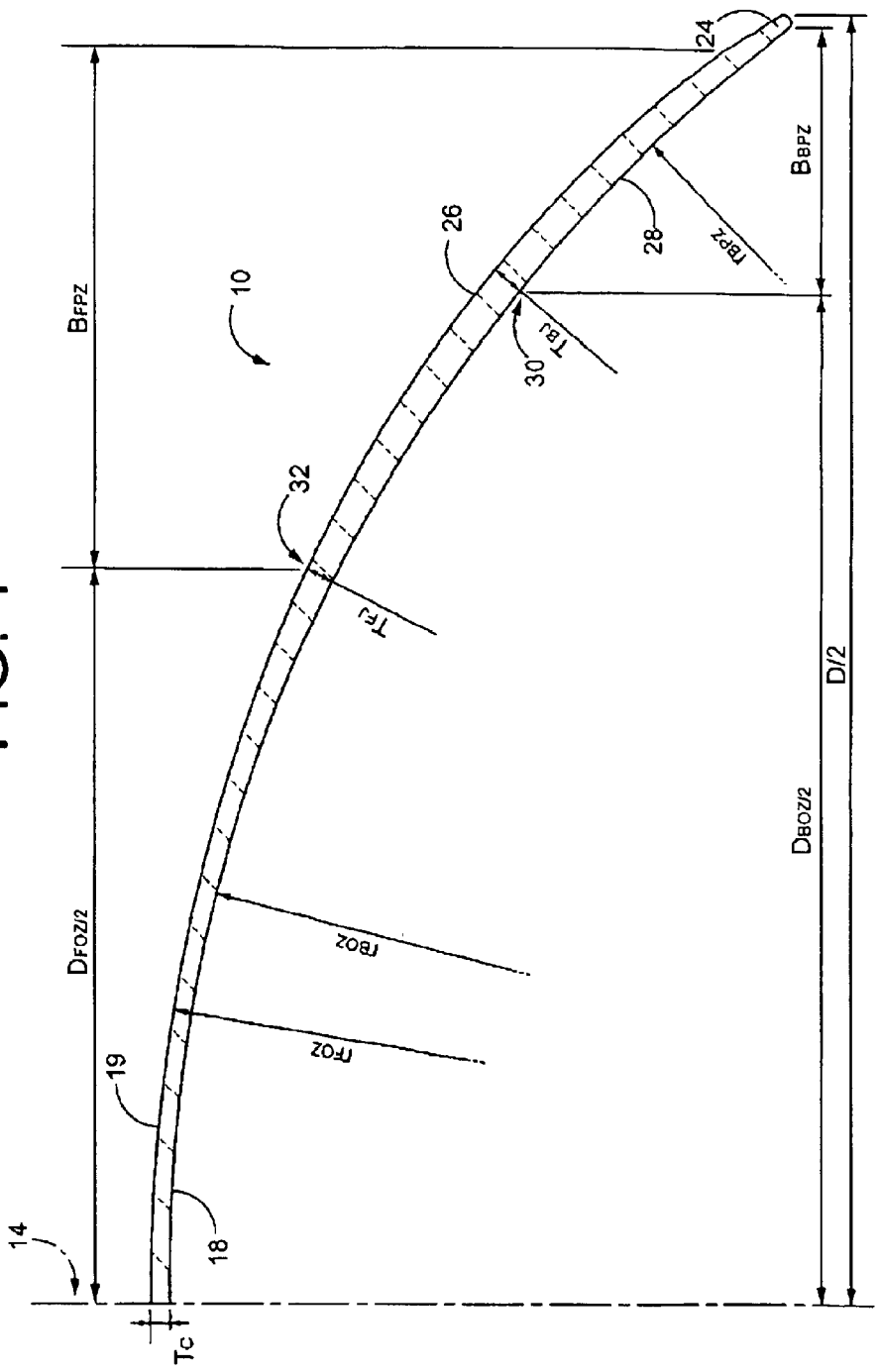
FIG. 1 is a magnified view in radial cross section of a contact lens according to a first embodiment of the present invention.
Figure 2:
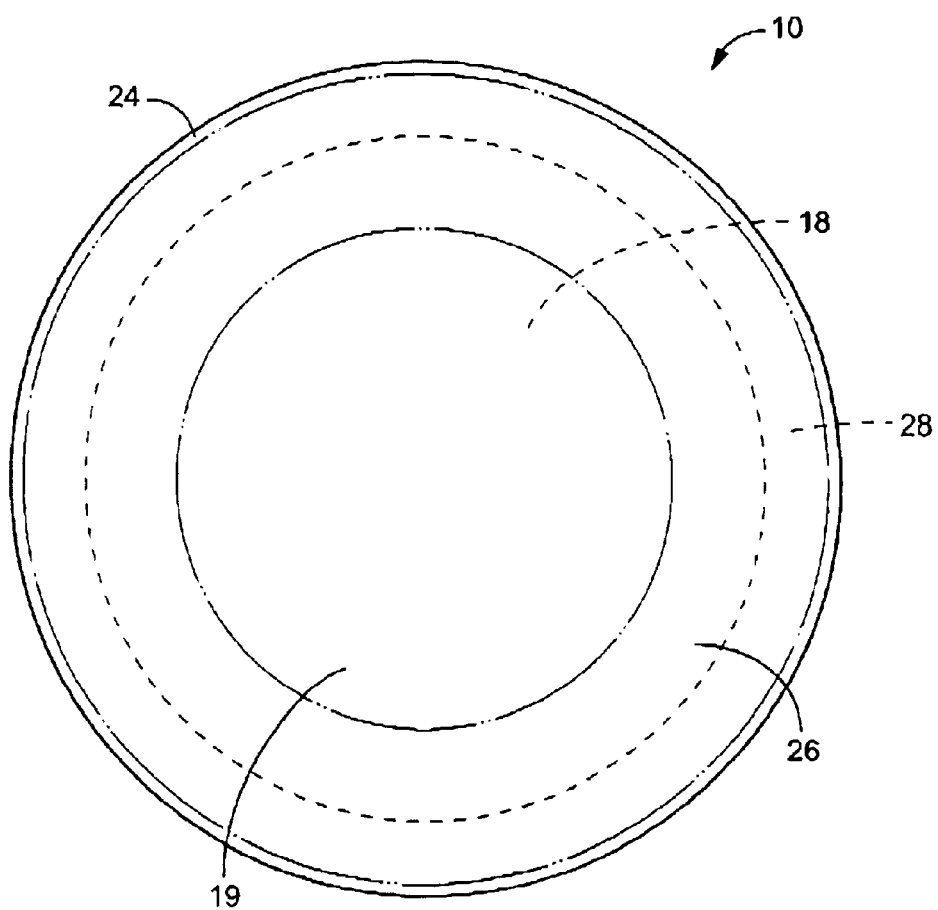
FIG. 2 is a front elevational view of the contact lens of FIG. 1.

Referring first to FIGS. 1 and 2 a contact lens 10 is shown as one embodiment of the present invention. The contact lens 10 has a generally dome shape in its entirety, and can be worn on a cornea of a lens wearer with its back surface held in contact with a surface of the cornea via tear fluid, as well known in the art. The contact lens 10 has a center axis 14 approximately aligned with an optical axis of the lens, and is shaped as a solid of revolution about the center axis 14. For the sake of this geometrical feature of the contact lens 10, FIG. 1 shows only a symmetrical half of the contact lens 10 in its diametrical cross section.

More specifically described, the contact lens 10 includes a front surface and the back surface. A central portion of the front surface serves as a front optical zone 19, while a central portion of the back surface serves as a back optical zone 18. These front and back optical zones 19, 18 have circular shapes in a plane view or as seen in a direction of the optical axis, and cooperate with each other to form an optical zone provided with a suitable degree of dioptric power for vision correction. These circular front and back optical zones 19, 18 have centers located on the center axis 14, and have different diameters. The front optical zone 19 has a diameter $D_{FOZ}$ that is approximately 60% of a diameter D of the contact lens 10, while the back optical zone 18 has a diameter $D_{BOZ}$ that is approximately 80% of the diameter D of the contact lens 10. These diameters $D_{FOZ}$, $D_{BOZ}$, D of the front optical zone, the back optical zone, and the contact lens 10 may be suitably determined, but not be limited while taking into account a size of a cornea and/or sclera, wearing conditions or the like. In general, the diameter $D_{FOZ}$ of the front optical zone may be desirably held within a range of 0.55–0.85 ($0.55 \leq D_{FOZ}/D \leq 0.85$) and the diameter $D_{BOZ}$ of the back optical zone may be desirably held within a range of 0.70–0.90 ($0.70 \leq D_{FOZ}/D \leq 0.90$) so that the contact lens 10 can provide excellent optical characteristics, a good circulation of tear fluid existing between the cornea and the contact lens, and an excellent positioning stability.

The back optical zone 18 serves as a base curved surface of a concave form or profile as seen in its diametrical cross section, whose center of curvature is located on the center axis 14 on the back side of the contact lens 10 (at the right-hand side of FIG. 1). A radius of curvature $r_{BOZ}$ of the back optical zone 18 is suitably determined so that the back optical zone 18 has topography generally similar to that of the surface of the cornea when the contact lens 10 is worn on the cornea. With the contact lens 10 worn on the cornea, a tear fluid layer exists between the back optical zone 18 and the surface of the cornea. The tear, fluid layer is arranged to have a generally constant thickness over the entire area, thus eliminating or restricting a possible function of the tear fluid layer as a lens. The form of the base curved surface in diametrical or vertical cross section may be suitably selected from a variety of inwardly curved or concaved forms, while taking into account the topography of the cornea of the lens wearer, wearing conditions and the like. For instance, the base curved surface may have an arcuate form with a constant radius of curvature, or alternatively a conic section with a radius of curvature varying in a diametric direction. The back optical zone 18 is shaped as a solid of revolution about the center axis 14.

On the other hands the front optical zone 19 is defined by a curved surface suitably designed so that a combination of the base curved surface and the front optical zone 19 provides a desired degree of dioptric power of the lens. In the present embodiment, the front optical zone 19 has an outwardly curved or convex form as seen in diametrical vertical cross section, whose center of curvature is located on the center axis 14 on the back side of the contact lens 10 (at the right-hand side of FIG. 1), and whose radius of curvature $r_{FOZ}$ is suitably determined. The form of the front optical zone 19 in vertical cross section may also be suitably selected from a variety of outwardly curved or convex forms, also, while taking into account the form of the back optical zone 18, a required dioptric power, wearing conditions and the like. For instance, the front optical zone 19 may have an arcuate form with a constant radius of curvature $r_{FOZ}$, or alternatively a conic section with a radius of curvature $r_{FOZ}$ varying in a diametric direction. The front optical zone 19 is shaped as a solid of revolution about the center axis 14.

These front and back optical zones 19, 18 cooperate with each other to provide an optical zone expected to exhibit an optical effect on a vision of the lens wearer. Generally, a peripheral portion of the optical zone, or a boundary between the optical zone and a peripheral zone surrounding the optical zone (which will be described later) may be recognized as a changing point of curvature of each of the front and back surfaces of the lens as seen in vertical cross section of the contact lens 10. In this respect, the boundary between the optical zone and the peripheral zone is not necessarily required to be clearly distinguishable as a circumferential line on each of the front and back surfaces of the contact lens. For instance, the boundary may not be clearly distinguished as the circumferential line when the optical zone has a form in vertical cross section that is gradually changed in the radial direction, or alternatively when the boundary on each of the front and back surfaces of the lens has a given radial width to serve as a connecting area adapted to smoothly join the optical zone and the peripheral zone.

The contact lens 10 includes the above-mentioned peripheral zone surrounding the optical zone, and an outermost edge 24 surrounding the peripheral zone. This edge 24 is disposed in the outermost peripheral portion of the contact lens 10 with an annular shape. The edge 24 includes a tip end having a semi-circular shape in vertical cross section and front and back beveled surfaces extending radially inwardly from the tip end. By the front and back beveled surfaces, the edge 24 is smoothly joined to the front and back peripheral zones 26, 28, respectively. It is noted that only the front beveled surface is depicted in the drawings.

The peripheral zone is defined by the front and back peripheral zones 26, 28 located radially outward of the front and back optical zones 19, 18. Each of the front and back peripheral zones 26, 28 has an annular shape extending continuously circumferentially with a given radial width, whose center is located on the center axis 14. These front and back peripheral zones 26, 28 have respective radial width dimensions $B_{FPZ}$, $B_{BPZ}$ different from each other, and are disposed between the front and back optical zone 19, 18 and the front and back beveled surface of the edge 24, respectively. The front and back peripheral zones 26, 28 join at their inner circumferential edges to the front and back optical zones 19, 18, respectively.

The back peripheral zone 28 may have a variety of forms in vertical cross section, including a single arc form extending with a given constant radius of curvature $r_{BPZ}$ and other forms extending with a radius of curvature $r_{BPZ}$ vary in the radial direction. Examples of the variety of forms in vertical cross section of the back peripheral zone 28 may include: an arcuate consisting of a plurality of arcs join together in the radial direction such that radius of curvatures of these arcs gradually increases in the radially outward direction and connecting with each other; a curve of polynomial form where a radius of curvature gradually increases in the radially outward direction; curves of conic sections; and other possible forms. A boundary or back junction 30 in which the back optical zone 18 and the back peripheral zone 28 join together may have an angle as seen in vertical cross section, or alternatively may have no angle and lie on tangents common to curves of the back optical zone 18 and the back peripheral zone 28. Also, the back junction 30 may be formed by a smooth arcuate surface having a given radial width so as not to be provided with an apparent edge. In general, the back peripheral zone 28 is provided with a suitable radius of curvature that is determined so as to permit a good circulation of tear fluid existing between the cornea and the contact lens 10. For the general purpose of vision correction, the back peripheral zone 28 has a radius of curvature that is made larger than that of the back optical zone 18.

On the other hand, the front peripheral zone 26 is defined by a special arcuate form in vertical cross section, which form is determined with a shape stabilizing ability of the optical zone taken into consideration. The thus formed peripheral zone cooperates with the optical zone to effectively allow the contact lens 10 to exhibit a shape stabilizing capability or effect.

Described in detail, the optical zone of the contact lens 10 is dimensioned such that a central lens thickness $T_c$, which is a thickness of the contact lens 10 as measured along the center axis 14, is held within a range of 0.03 mm $\leq T_C \leq$ 0.50 mm, while a front junction lens thickness $T_{FJ}$, which is a thickness of the contact lens 10 as measured at a boundary or front junction 32 between the front optical zone 19 and the front peripheral zone 26, is not less than 0.05 mm (0.05 mm $\leq T_{FJ}$).

There will be described a method of designing the optical zone of the contact lens 10 arranged for treating myopia (minus diopters) by way of example. First, a form of the back optical zone 18 is designed with a surface topography of a cornea of a lens wearer taken into consideration. Then, a form of the front optical zone 19 is designed with a determined form of the back optical zone 18 taken into consideration so that the front optical zone 19 cooperates with the back optical zone 18 to provide a required degree of dioptric power for the lens. Subsequently, a peripheral portion of the front optical zone 19 or the front junction 32 is positioned relative to the back optical zone 18 such that the front junction lens thickness $T_{FJ}$ of the contact lens 10 as measured at the front junction 32 is provisionally set to 0.05 mm. With the front junction lens thickness $T_{FJ}$ provisionally set as described above, the central lens thickness $T_C$ of the contact lens 10 is measured along the center axis 14. Then, it is judged whether the obtained central lens thickness $T_C$ is not less than 0.03 mm (0.03 mm $\leq T_C$) or not. If the central lens thickness $T_C$ is not less than 0.03 mm, the provisional front junction lens thickness $T_{FJ}$ is actually employed. If the central lens thickness $T_C$ is less than 0.03 mm, the front junction lens thickness $T_{FJ}$ is changed to a value slightly larger than 0.05 mm, and then the above-described methods are repeated until the central lens thickness $T_C$ is held within a range of 0.03–0.50 mm (0.03 mm$\leq T_C \leq$0.50 mm). The provisional front junction lens thickness $T_{FJ}$ at the time when the central lens thickness $T_C$ meets the above-indicated requirement (0.03 mm$\leq T_C \leq$0.50 mm), is actually employed as a form of the front optical zone 19.

Contact lenses for treating hyperopia (plus diopters) may be basically designed according to the above described method. Preferably, the method is arranged as follows: For provisionally setting a position of the front junction 32 relative to the back optical zone 18, the central lens thickness $T_C$ of the contact lens 10 measured along the center axis 14 is provisionally set to 0.03 mm. With the central lens thickness $T_C$ set to 0.03 mm, the front junction lens thickness $T_{FJ}$ of the contact lens 10 is measured at the front junction 32, and then it is judged whether the obtained front junction lens thickness $T_{FJ}$ is not less than 0.05 mm or not. Namely, the form of the front optical zone 19 is designed so that the central lens thickness $T_C$ and the front junction lens thickness $T_{FJ}$ meet the above described requirements, respectively.

In any contact lenses provided with positive refractive powers and with negative refractive powers as well, a value of the front junction lens thickness $T_{FJ}$ is made not smaller than 0.05 mm, and an upper limit of the front junction lens thickness $T_{FJ}$ is determined so that the central lens thickness $T_C$ is held within the range of 0.03–0.50 mm (0.03 mm$\leq T_C \leq$0.50 mm), whereby the front junction lens thickness $T_{FJ}$ can have a sufficiently small value. Suitable values of the central lens thickness $T_C$ and the front junction lens thickness $T_{FJ}$ are selected from the respective given ranges, i.e., "0.03 mm$\leq T_C \leq$0.50 mm" and "0.05 mm$\leq T_{FJ}$", while taking into consideration selected materials of the lens, or the like.

The methods of designing contact lenses as described above make it possible to effectively design the form of the optical zone of the contact lens 10 such that the central lens thickness $T_C$ measured along the center axis 14 is held within a range of 0.03–0.50 mm, or alternatively is held within a specific narrower range of 0.05–0.50 mm, for example, and the front junction lens thickness $T_{FJ}$ measured at the front junction 32 is made not less than 0.05 mm. The optical zones designed to meet the above-described lens thickness requirements are made approximately identical with each other in their forms and thickness, so long as the required dioptric power of the lens is equal to each other, while a diameter of the optical zone is desirably determined. The front junction and central lens thickness $T_{FJ}$, $T_C$ are not particularly limited to the specific values as described above. In order to design contact lenses for treating myopia, for example, the front junction lens thickness $T_{FJ}$ is set to 0.10 mm or a desirable value of not less than 0.05 mm, while the central lens thickness $T_C$ is held within a range of 0.05–0.50 mm (0.05 mm$\leq T_C \leq$0.50 mm), or within a further limited range.

A number of test specimens of a soft contact lens according to the present embodiment were prepared. These test specimens were provided with different base curves, different front curves and different dioptric powers, and were made different from one another in form and thickness of their peripheral zones. The thus prepared test specimens were actually worn by a number of monitors who have an experience of wearing contact lenses, and were evaluated by the monitors in terms of a front-back differentiation, wearing comfort, and visual or optical fitting. By "front-back differentiation" was evaluated easiness in handling the contact lenses, while by "wearing comfort" was evaluated presence or absence of discomfort or stimulation for the lens wearers. A result of the evaluation of the contact lenses conducted by the monitors is partially demonstrated in Table 1. A tremendous number of evaluation data collected from the monitors are statically processed and demonstrated in a graph of FIG. 3, rather than directly introduced in the specification.

It is appropriate to examine the obtained evaluation data in relation to values of the diameter of the optical zone, more specifically, the diameter $D_{FOZ}$ of the front optical zone, as for positive refractive power lenses whose dioptric powers P are larger than 0 diopter, and high-minus or negative refractive lenses whose dioptric powers P are smaller than −10, unlike in the contact lenses for treating myopia whose dioptric powers ranging from −10 diopters to 0 diopters.

Described in detail, a statically processed tremendous number of evaluation data for the contact lenses provided with the high negative refractive power, i.e., a dioptric power of not larger than −10 diopters, have revealed that where the diameter of the front optical zone $D_{FOZ}$ is smaller than 7.0 mm ($D_{FOZ} \leq$7.0 mm), the result of evaluation was not so much different from that for the contact lenses with the dioptric power P of −10 (P=−10), irrespective of the dioptric power P. Where the diameter of the front optical zone $D_{FOZ}$ is not smaller than 7.0 mm ($D_{FOZ} \geq$7.0 mm), on the other hand, the result of evaluation with respect to contact lenses whose peripheral zones vary in form and thickness varied depending upon the dioptric powers P of the contact lenses. The statically processed tremendous number of evaluation data are demonstrated in the graph of FIG. 4.

Similarly, a statically processed tremendous number of evaluation data for the contact lenses provided with the positive refractive power, i.e., a dioptric power of not smaller than 0 diopter, have revealed that where the diameter of the front optical zone $D_{FOZ}$ is smaller than 7.0 mm ($D_{FOZ}<$7.0 mm), the result of evaluation was not so much different from that for the contact lenses with the dioptric power P of 0 (P=0), irrespective of the dioptric power P. Where the diameter of the front optical zone $D_{FOZ}$ is not smaller than 7.0 mm ($D_{FOZ} \geq$7.0 mm), on the other hand, the result of evaluation with respect to contact lenses whose peripheral zones vary in form and thickness varied depending upon the dioptric powers P of the contact lenses. The statically processed tremendous number of evaluation data are demonstrated in the graph of FIG. 5.

Figure 3:
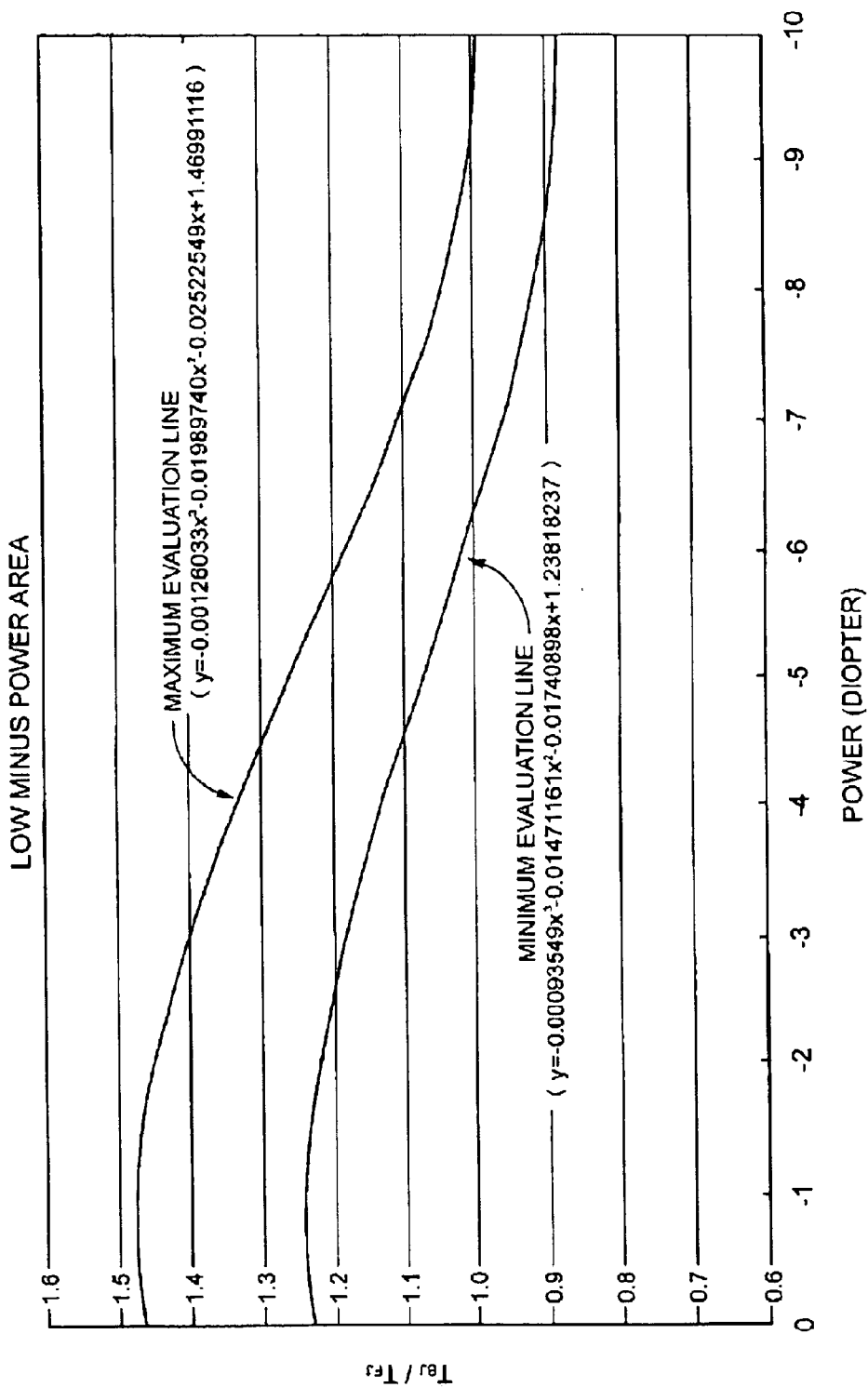
FIG. 3 is a statistic graph representing a result of monitor's evaluation of a variety of specimens of the contact lens of FIG. 1 whose dioptric powers range from −10 to 0 diopters.
Figure 4:
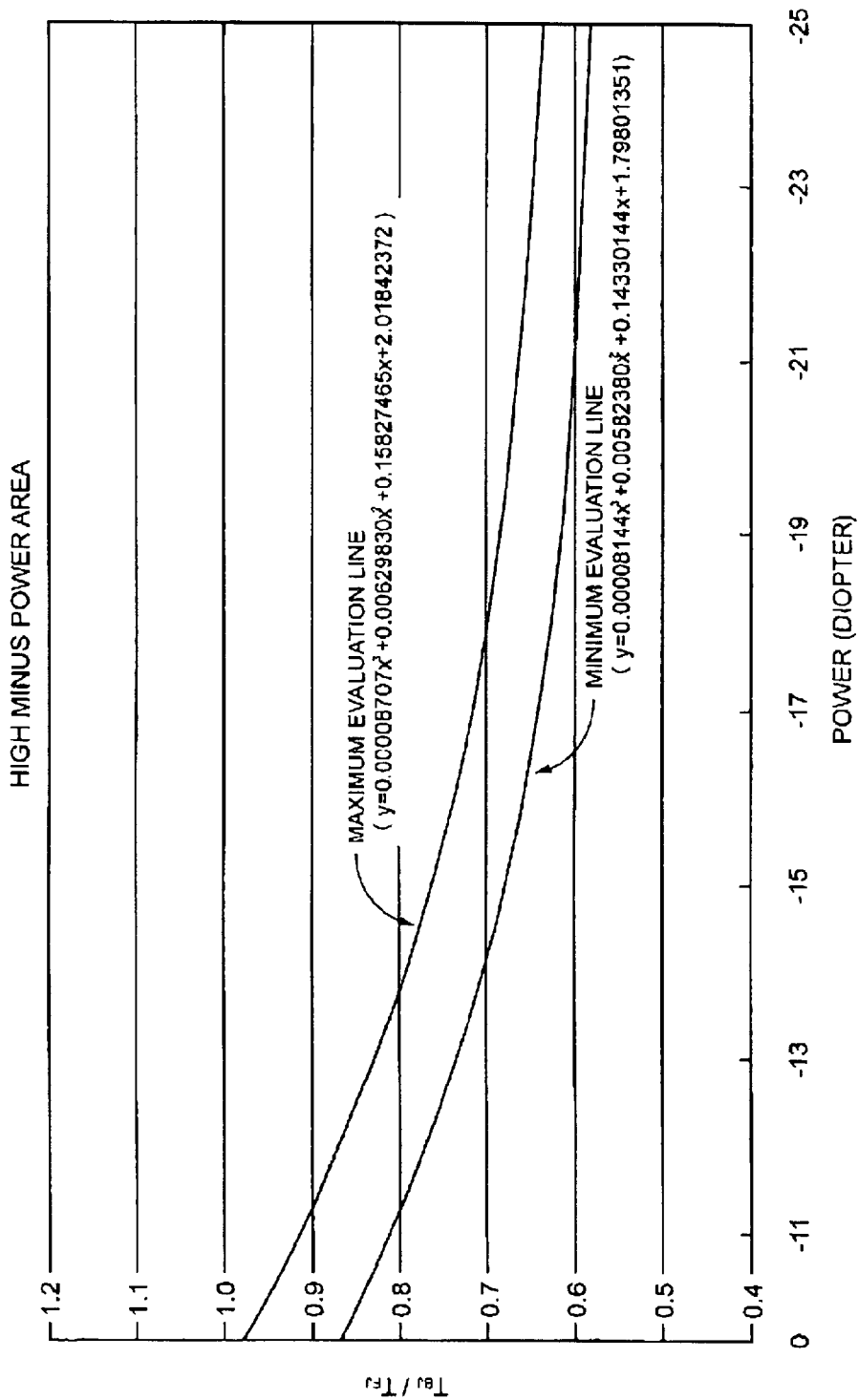
FIG. 4 is a statistic graph representing a result of monitor's evaluation of a variety of specimens of the contact lens of FIG. 1 whose dioptric powers are smaller than −10 diopters.
Figure 5:
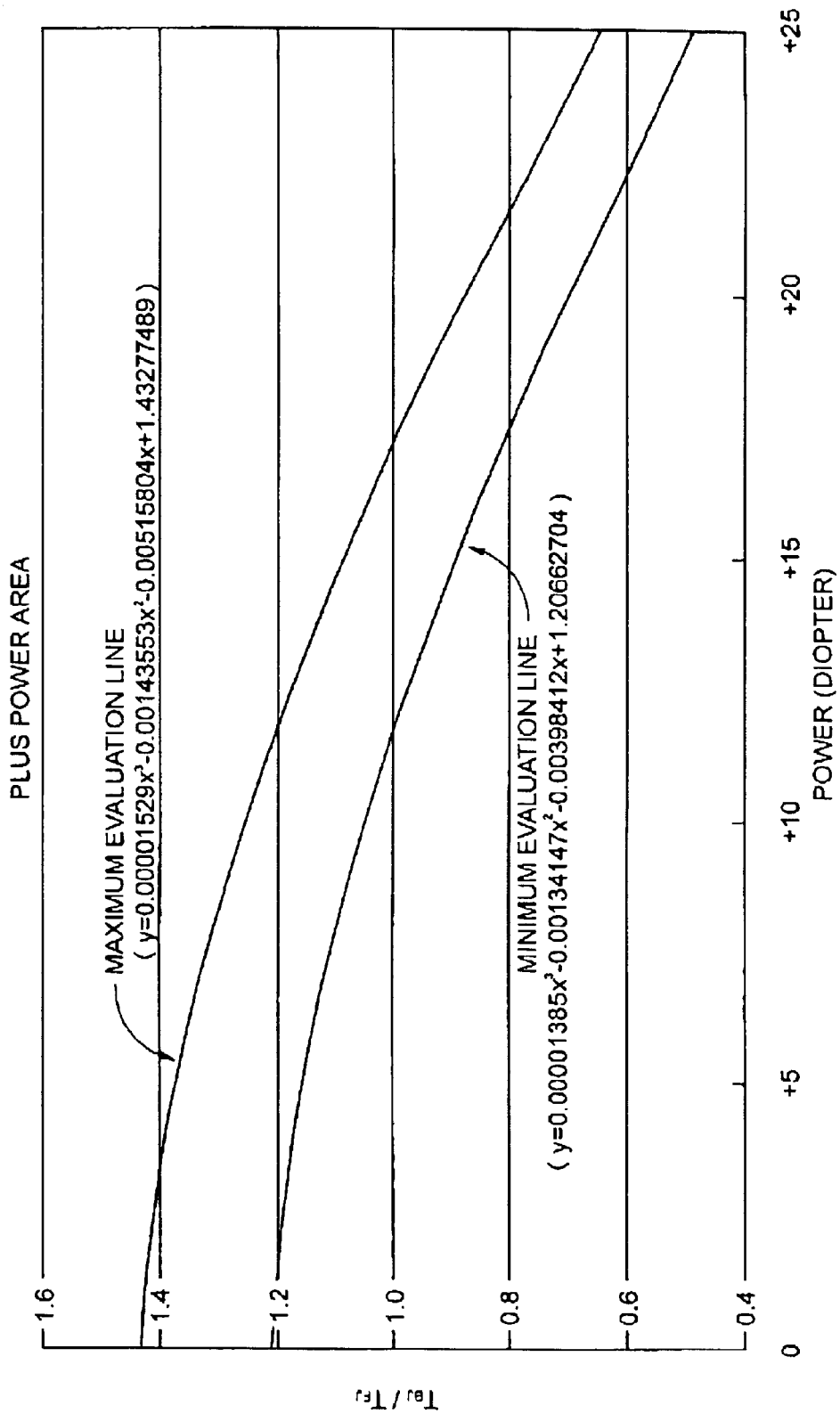
FIG. 5 is a statistic graph representing a result of monitor's evaluation of a variety of specimens of the contact lens of FIG. 1 whose dioptric powers are larger than 0 diopter.

It should be noted that while the test specimens of the soft contact lens used in this monitor evaluation demonstrated in the graph of FIGS. 3–5 were made of HEMA (hydroxyethyl methacrylate) or the like, the similar result is confirmed in the monitor evaluation for test specimens of soft contact lenses of the present embodiment made of different materials, so long as the selected materials have a rigidity similar to that of materials generally employed for contact lenses.

TABLE 1

| | | | | dioptric power (P) = 3.00 diopters | | |
|---|---|---|---|---|---|---|
| $T_C$ | $T_{BJ}/T_{FJ}$ | $T_{FJ}$ | $T_{BJ}$ | front-back differentiation | wearing comfort | visual fitting |
| 0.095 | 1.05 | 0.144 | 0.151 | x | ○ | ○ |
| 0.095 | 1.10 | 0.144 | 0.158 | Δ | ○ | ○ |
| 0.095 | 1.15 | 0.144 | 0.166 | ○ | ○ | ○ |
| 0.095 | 1.25 | 0.144 | 0.180 | ○ | ○ | ○ |
| 0.095 | 1.35 | 0.144 | 0.194 | ○ | ○ | ○ |
| 0.095 | 1.40 | 0.144 | 0.202 | ○ | Δ | ○ |
| 0.095 | 1.45 | 0.144 | 0.209 | ○ | x | Δ |
| 0.080 | 1.25 | 0.130 | 0.163 | ○ | ○ | ○ |

○: 80% or more of monitors gave affirmative evaluation.
Δ: 50% or more of monitors gave affirmative evaluation.
x: Less than 50% of monitors gave affirmative evaluation.

The graphs of FIGS. 3–5 show an area defined by a maximum evaluation line and a minimum evaluation line where almost all monitors evaluate that the test specimens of the soft contact lenses are satisfactory in term of front-back differentiation, wearing comfort and the visual fitness. The results of evaluation demonstrated in the graph of FIGS. 3–5 have revealed that the contact lenses designed to meet the requirements that the optical zone has the central lens thickness $T_C$ held within a range of 0.03 mm$\leq T_C \leq$0.50 mm, and a front-junction lens thickness $T_{FJ}$ of not less than 0.05 mm (0.05 mm$\leq T_{FJ}$) have a specific relationship between a ratio $T_{BJ}/T_{FJ}$ of a back junction lens thickness $T_{BJ}$ and the front junction lens thickness $T_{FJ}$ and dioptric powers of the lenses, in relation to evaluation for lens handling and comfort.

The results of the evaluation of the contact lenses by the monitors (see especially in FIG. 3) lead to the following conclusions: The first conclusion is that it is effective for the contact lenses provided with a dioptric power P within a range of 0–0.6(-6$\leq$P$\leq$0) to be designed such that the optical zone has a central lens thickness $T_C$ held within a range of 0.03 mm$\leq T_C \leq$0.50 mm, and a front junction lens thickness $T_{FJ}$ of not less than 0.05 mm (0.05 mm$\leq T_{FJ}$) as described above, and that the back junction 30 is located radially outward of the front junction 32 so as to set the above-indicated ratio $T_{BJ}/T_{FJ}$ of the back junction lens thickness $T_{BJ}$ and the front junction lens thickness $T_{FJ}$ to at least 1 or more. This arrangement permits for contact lenses to be thin and comfortable to wear without needing a considerable increase of their thickness, and to ensure a good shape stability in their entirety.

Conventionally, the thickness of a contact lens is made larger as measured at its front junction, since it has been considered to be effective to improve the shape stability of the contact lens, as disclosed in the documents mentioned in the paragraph of related arts, and the thickness of the contact lens as measured at its back junction is generally made smaller than that measured at the front junction. As is understood from the result of the evaluation of the contact lenses conducted by the monitors, the contact lens of the present embodiment employs a specific lens design as described above with regard to the central lens thickness, the front junction lens thickness and a positional relationship between the front junction 32 and the back junction 30 relative to each other, so that it is effective to make the lens thickness as measured at the back junction 30 not smaller than that as measured at the front junction 32. Thus, the contact lens according to the present embodiment is capable of achieving both of excellent lens handling and comfort, where the contact lens is provided with a dioptric power P within a range of 0–-6(-6$\leq$P$\leq$0).

The second conclusion is that a contact lens is able to be comfortable to wear and easy to handle by being designed such that the optical zone has a central lens thickness $T_C$ held within a range of 0.03 mm$\leq T_C \leq$0.50 mm, and a front junction lens thickness $T_{FJ}$ of not less than 0.05 mm (0.05 mm$\leq T_{FJ}$) as described above, and that the back junction 30 is located radially outward of the front junction 32 so as to arrange the above-indicated ratio $T_{BJ}/T_{FJ}$ of the back junction lens thickness $T_{BJ}$ to the front junction lens thickness $T_{FJ}$ to meet specific condition expressions that vary depending upon the dioptric power P of the contact lens.

The specific condition expressions can be described as follows by utilizing the maximum and minimum evaluation lines shown in the graphs of FIGS. 3–5:

a) where the dioptric power P of the lens is held within range of 0–-10(-10$\leq$P$\leq$0), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.2382
$A_1$=-0.1741
$A_2$=-1.4711
$A_3$=-0.9355
$B_0$=+1.4699
$B_1$=-0.2523
$B_2$=-1.9897
$B_3$=-1.2603 b) where the dioptric power P of the lens is not larger than -10(P<-10) or in a range of a so called "high minus", and (1) if the diameter of the front optical zone $D_{FOZ}$ is smaller than 7.0 mm ($D_{FOZ}$<7.0 mm), $$0.877 \leq T_{BJ}/T_{FJ} \leq 0.993$$

(2) if the diameter of the front optical zone $D_{FOZ}$ is not smaller than 7.0 mm ($D_{FOZ}\geq$-7.0 mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.7980
$A_1$=+1.4330
$A_2$=+0.5824
$A_3$=+0.0814
$B_0$=+2.0184
$B_1$=+1.5827
$B_2$=+0.6298
$B_3$=+0.0871 c) where the dioptric power P is larger than 0 (P>0) or in a range of positive refractive power, and (1) if the diameter of the front optical zone $D_{FOZ}$ is smaller than 7.0 mm ($D_{FOZ}$<7.0 mm), $$1.238 \leq T_{BJ}/T_{FJ} \leq 1.470$$

(2) if the diameter of the front optical zone $D_{FOZ}$ is not smaller than 7.0 mm ($D_{FOZ}\geq$7.0 mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.2066
$A_1$=-0.0398
$A_2$=-0.1341

$A_3=+0.0139$
$B_0=+1.4328$
$B_1=-0.0516$
$B_2=-0.1436$
$B_3=+0.0153$

For the sake of easiness in understanding the present embodiment, the maximum and minimum evaluation lines are approximately obtained according to the condition expressions for respective ranges of dioptric powers, and are represented by of curves of polynomials in the graphs of FIGS. 3–5.

While the presently preferred embodiment of the invention has been described above in detail for illustrative purpose only, it is to be understood that the invention is not limited to the details of the illustrated embodiment, but may be otherwise embodied.

While the soft contact lens 10 has been described in detail as one preferred embodiment of the present invention, the principle of the present invention is equally applicable to any contact lenses other than the soft contact lens, e.g., hard-type contact lenses formed of any one or more of a variety of known materials for hard-type contact lenses. A hard contact lens constructed according to the present invention is thin, comfortable to wear and excellent in its strength, shape stability, and deformation resistance.

The above-described method of designing a contact lens of the present invention can be mainly characterized in that the ratio $T_{BJ}/T_{FJ}$ of the back junction lens thickness $T_{BJ}$ and the front junction lens thickness $T_{FJ}$ is dimensioned to meet the specific condition expressions selected depending upon the dioptric power of the lens. It should be appreciated that values actually employed for the specific condition expressions can be adjusted depending upon materials of the contact lens other possible factors. It is also possible to further limit values for the specific condition expressions, within a predetermined range of the conditions expressions according to the present invention.

EXAMPLES

Seven specimens of a contact lens constructed according to the present invention were prepared as referenced by Examples 1–7, respectively. Detailed configurations of the contact lenses of Examples 1–7 are shown in FIGS. 6–12, respectively. In the interest of brevity and simplification, the same reference numerals as used in the illustrated embodiment will be used in the Examples 1–7 to identify the corresponding parts or portions, and redundant description of these components will not be provided. All of the contact lenses of Examples 1–7 measure 14 mm in diameter D and 11 mm in back optical zone diameter $D_{BOZ}$.

Figure 6:
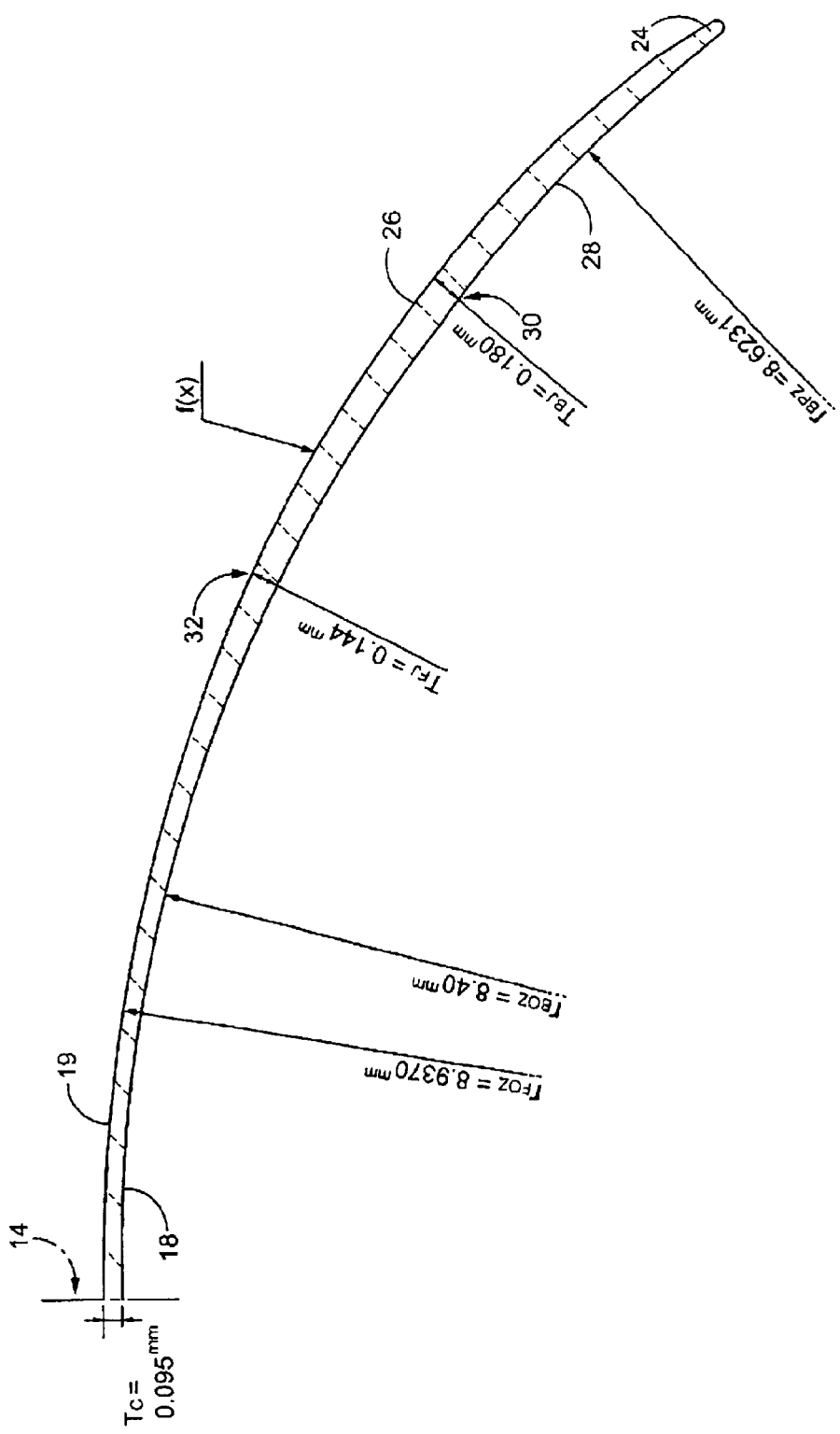
FIG. 6 is a magnified view in radial cross section of an Example 1 of the contact lens of FIG. 1.

FIG. 6 shows the contact lens of Example 1 in vertical cross section, which measures 8 mm in front optical zone diameter $D_{FOZ}$. A back optical zone 18 has an arcuate form in vertical cross section with a radius of curvature $r_{BOZ}$ of 8.40 mm. A front optical zone 19 also has an arcuate form in vertical cross section with a radius of curvature $r_{FOZ}$ of 8.9370 mm. As a result, the back and front optical zones 18, 19 cooperate with each other to provide a dioptric power P of −3.00 diopters. The contact lens has a central lens thickness $T_C$ of 0.095 mm, which is a thickness of the contact lens as measured along a center axis 14, and a front junction lens thickness $T_{FJ}$ of 0.144 mm, which is a thickness of the contact lens as measured at a front junction 32. A back peripheral zone 28 of the contact lens has an arcuate form in vertical cross section with a radius of curvature $r_{BPZ}$ of 8.6231 mm.

With the contact lens of Example 1 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 1.25 so that the contact lens of Example 1 meets the requirements represented by the maximum and minimum evaluation lines in the graph of FIG. 3. According to Example 1, a form of the front peripheral zone 26 in cross section is represented by the following polynomial of third order on the condition that a surface of the front peripheral zone 26 passes through a point where a back junction 30 measures 0.18 mm in lens thickness, the peripheral zone of the lens is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
$a=-1.96075\times10^{-2}$
$b=1.69572\times10^{-1}$
$c=-9.15919\times10^{-1}$
$d=9.75528$ The contact lens configured according to Example 1 meets the requirements of the present invention, and accordingly permits to be excellent in handling or differentiating between the front and back surface of the contact lens, as well as to be highly comfortable to wear.

Figure 7:
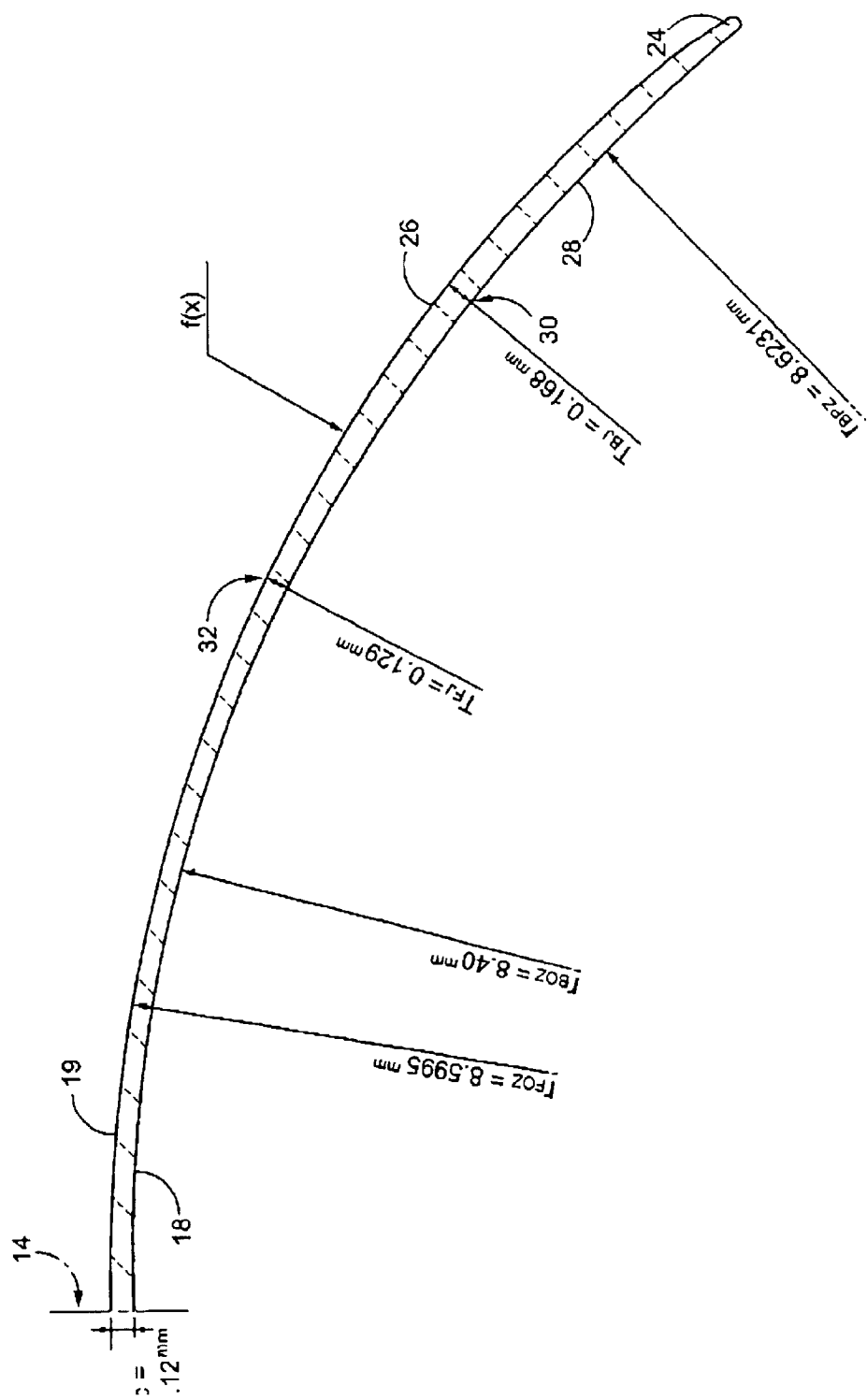
FIG. 7 is a magnified view in radial cross section of an Example 2 of the contact lens of FIG. 1.

FIG. 7 shows the contact lens of Example 2 in vertical cross section, which measures 8 mm in front optical zone diameter $D_{FOZ}$. A back optical zone 18 has an arcuate form in vertical cross section with a radius of curvature $r_{BOZ}$ of 8.40 mm. A front optical zone 19 also has an arcuate form in vertical cross section with a radius of curvature $r_{FOZ}$ of 8.5995 mm. As a result, the back and front optical zones 18, 19 cooperate with each other to provide a dioptric power P of −1.00 diopters. The contact lens has the central lens thickness $T_C$ of 0.12 mm and the front junction lens thickness $T_{FJ}$ of 0.129 mm. A back peripheral zone 28 of the contact lens has an arcuate form in vertical cross section with a radius of curvature $r_{BPZ}$ of 8.6231 mm.

With the contact lens of Example 2 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 1.30 so that the contact lens of Example 2 meets the requirements represented by the maximum and minimum evaluation lines in the graph of FIG. 3. According to Example 2, a form of the front peripheral zone 26 in cross section is represented by the following polynomial of third order on the condition that a surface of the front peripheral zone 26 passes through a point where a back junction 30 measures 0.168 mm in lens thickness, the peripheral zone is connected at its inner peripheral portion to the peripheral portion of the optical zone and at its outer peripheral portion to the inner peripheral portion of the edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens a=−2.36813×10⁻² → $a=-2.36813\times10^{-2}$
b=2.40855×10⁻¹ → $b=2.40855\times10^{-1}$
c=−1.31558 → $c=-1.31558$
d=−1.04573×10 → $d=-1.04573\times10$ Like the contact lens of Example 1, the contact lens configured according to Example 2 meets the requirements of the present invention, and accordingly permits to be excellent in handling or differentiating between the front and back surface of the contact lens, as well as to be highly comfortable to wear.

Figure 8:
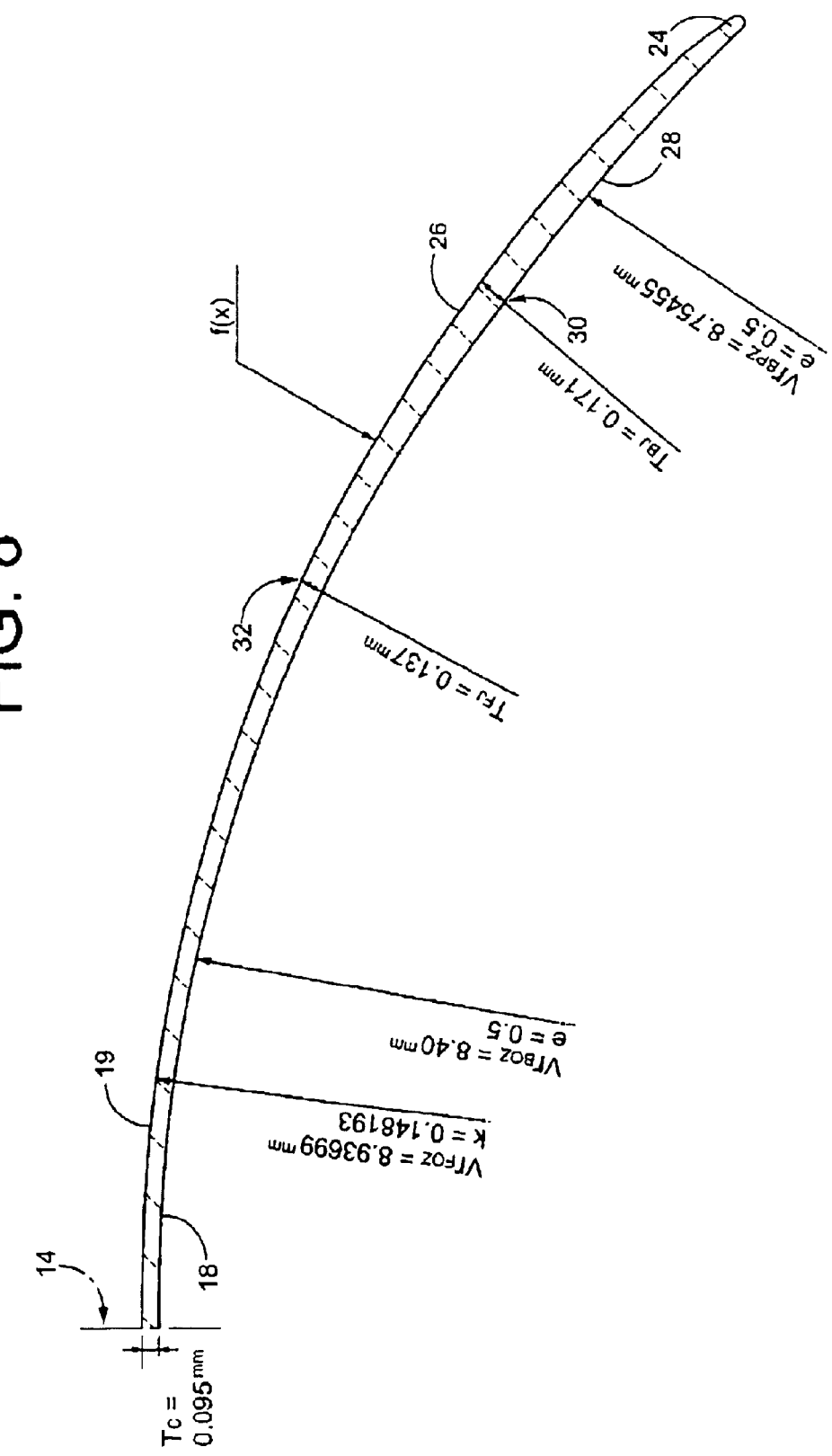
FIG. 8 is a magnified view in radial cross section of an Example 3 of the contact lens of FIG. 1.

FIG. 8 shows the contact lens of Example 3 in vertical cross section, which measures 8 mm in front optical zone diameter $D_{FOZ}$. A back optical zone 18 has a form, in vertical cross section, of a conic section or a surface of revolution of second order about its center axis 14, which has a vertex or apex radius $Vr_{BOZ}$ of 8.40 mm and an eccentricity e of 0.5. A back optical zone 19 has a form, in vertical cross section, of a conic section or a surface of revolution of second order about the center axis 14 with a vertex or apex radius $Vr_{FOZ}$ of 8.93699 mm and a conic coefficient k of 0.148193. As a result, the contact lens is provided with a dioptric power P of −3.00 diopters. The contact lens has a central lens thickness $T_C$ of 0.095 mm and a front junction lens thickness $T_{FJ}$ of 0.137 mm. A back peripheral zone 28 of the contact lens has a form of a conic section or a surface of revolution of second order about the center axis 14, which has a vertex or apex radius $Vr_{BPZ}$ of 8.75455 mm and an eccentricity e of 0.5.

With the contact lens of Example 3 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 1.25 so that the contact lens of Example 3 meets the requirements represented by the maximum and minimum evaluation lines in the graph of FIG. 3. According to Example 3, a form of the front peripheral zone 26 in cross section is represented by the following polynomial of third order on the condition that a surface of the front peripheral zone 26 passes through a point where a back junction. 30 measures 0.171 mm in lens thickness, the peripheral zone is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
$a=-1.09356\times10^{-2}$
$b=6.79957\times10^{-2}$
$c=-5.10568\times10^{-1}$
$d=9.21201$ Like the contact lenses of Examples 1 and 2, the contact lens configured according to Example 3 meets the requirements of the present invention, and accordingly permits to be excellent in handling or differentiating between the front and back surface of the contact lens, as well as to be highly comfortable to wear.

Figure 9:
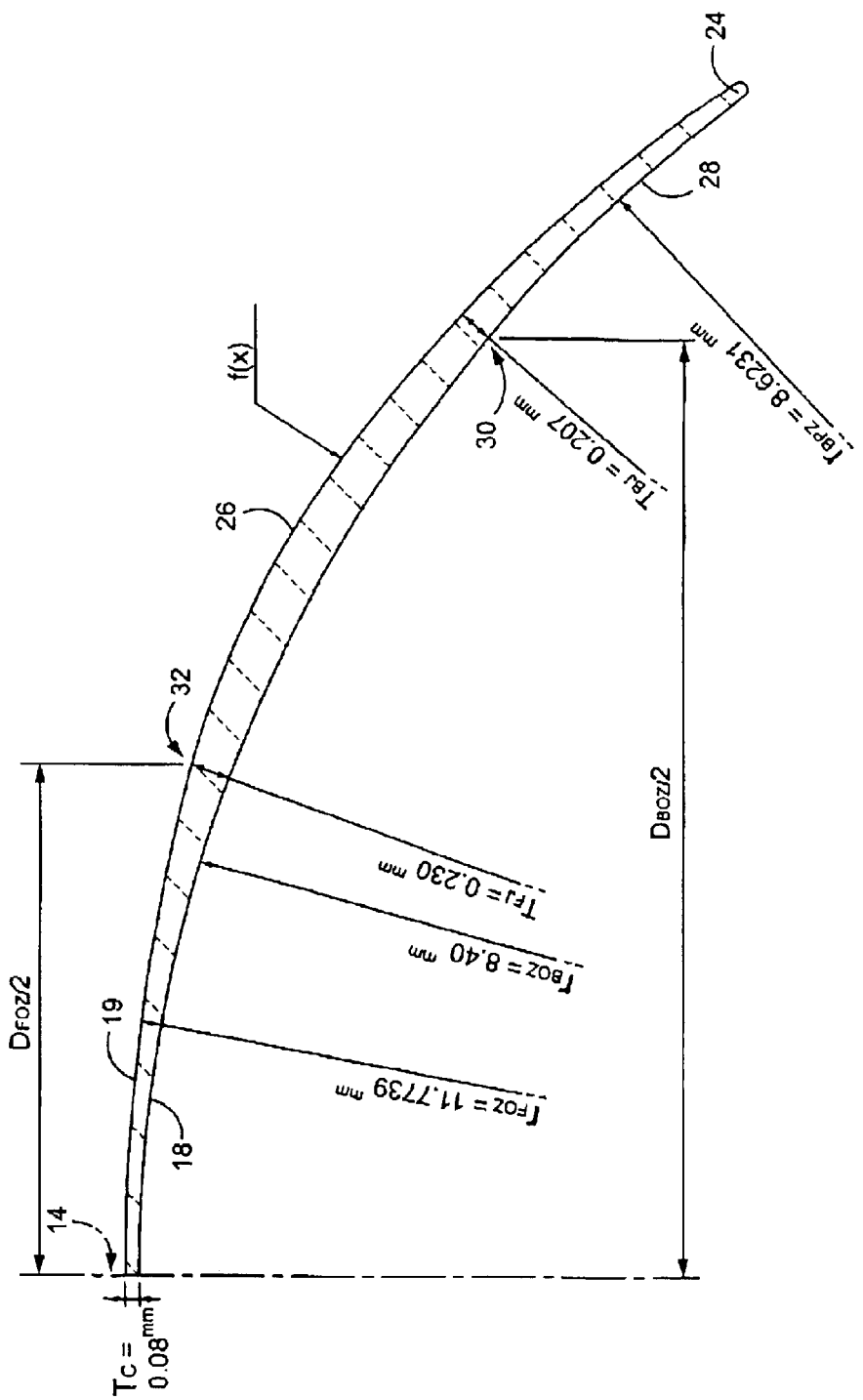
FIG. 9 is a magnified view in radial cross section of an Example 4 of the contact lens of FIG. 1.

FIG. 9 shows the contact lens of Example 4 in vertical cross section, which measures 6 mm in front optical zone diameter $D_{FOZ}$. A back optical zone 18 has an arcuate form in vertical cross section with a radius of curvature $r_{BOZ}$ of 8.40 mm. A front optical zone 19 also has an arcuate form in vertical cross section with a radius of curvature $r_{FOZ}$ of 11.7739 mm. As a result, the back and front optical zones 18, 19 cooperate with each other to provide a dioptric power P of −15.00 diopters. The contact lens has a central lens thickness $T_C$ of 0.08 mm, which is a thickness of the contact lens as measured along a center axis 14, and a front junction lens thickness $T_{FJ}$ of 0.230 mm, which is a thickness of the contact lens as measured at a front junction 32. A back peripheral zone 28 of the contact lens has an arcuate form in vertical cross section with a radius of curvature $r_{BPZ}$ of 8.6231 mm.

With the contact lens of Example 4 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 0–90 so that the contact lens of Example 4 meets the requirements represented by the following condition expression applied to the high-minus contact lenses:

$$0.877 \leq T_{BJ}/T_{FJ} \leq 0.993$$

According to Example 4, a form of the front peripheral zone 26 in cross section is represented by the following polynomial of third order on the condition that a surface of the front peripheral zone 26 passes through a point where a back junction 30 measures 0.207 mm in lens thickness, the peripheral zone is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
$a=-2.53921\times10^{-3}$
$b=-9.88608\times10^{-2}$
$c=3.98225\times10^{-1}$
$d=7.85502$ The contact lens configured according to Example 4 meets the requirements of the present invention, and accordingly permits to be excellent in handling or differentiating between the front and back surface of the contact lens, as well as to be highly comfortable to wear.

Figure 10:
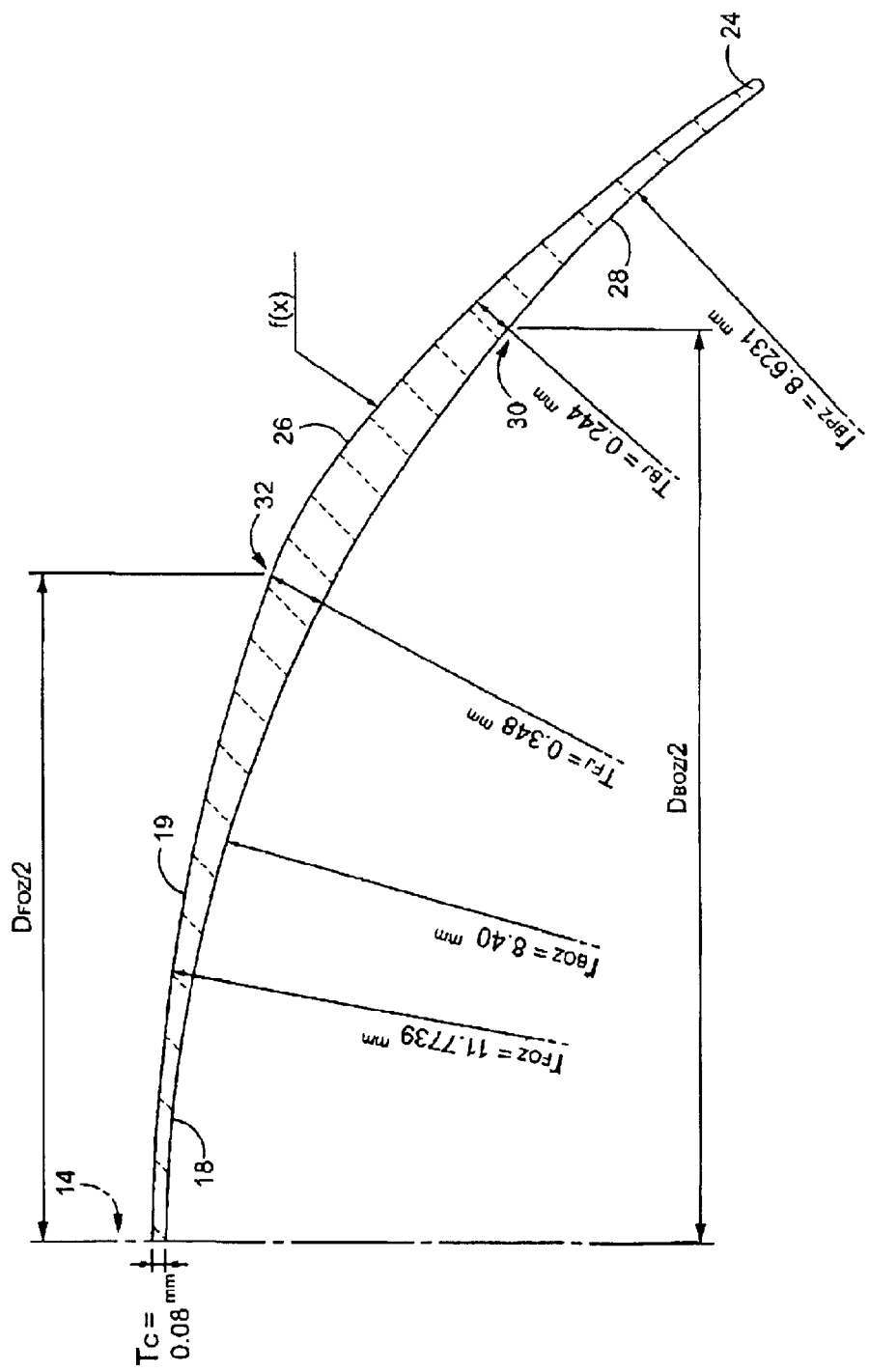
FIG. 10 is a magnified view in radial cross section of an Example 5 of the contact lens of FIG. 1.

FIG. 10 shows the contact lens of Example 5 in vertical cross section, which measures 8 mm in front optical zone diameter $D_{FOZ}$. Other than the front optical zone diameter, the contact lens according to Example 5, is identical with the contact lens according to Example 4, i.e., a back optical zone 18 has a radius of curvature $r_{BOZ}$ of 8.40 mm, a front optical zone 19 has a radius of curvature $r_{FOZ}$ of 11.7739 mm, a dioptric power P of −15.00 diopters, and a lens thickness $T_C$ is 0.08 mm. A back peripheral zone 28 has a radius of curvature $r_{BPZ}$ of 8.6231 mm, like in the contact lens of Example 4. Namely, the contact lens according to Example 5 is a high-minus contact lens that is identical in terms of basic optical characteristics with that of the contact lens of Example 4, except that the front optical zone diameter $D_{FOZ}$ of the contact lens of Example 5 is made larger than that of the contact lens of Example 4. Due to the relatively large front optical zone diameter $D_{FOZ}$, the front junction lens thickness $T_{FJ}$ is accordingly made larger than that of the contact lens of Example 4, to measure 0.348 mm.

With the contact lens of Example 5 dimensioned as described above, a front peripheral zone 26 is shaped based on conditions for arranging the ratio $T_{BJ}/T_{FJ}$ of the back junction lens thickness $T_{FJ}$ and the front junction lens thickness $T_{FJ}$ to 0.70 so that the contact lens of Example 5 meets the requirements represented by the maximum and minimum evaluation lines in the graph of FIG. 4. According to Example 5, a form of the front peripheral zone 26 in cross section is represented by the following polynomial of third order on the condition that a surface of the front peripheral zone 26 passes through a point where a back junction 30 measures 0.244 mm in lens thickness, the peripheral zone is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
a=2.87579×10⁻²
b=−6.27877×10⁻¹
c=3.28142
d=2.85956

The contact lens configured according to Example 5 meets the requirements of the present invention, and accordingly permits to be excellent in handling or differentiating between the front and back surface of the contact lens, as well as to be highly comfortable to wear.

Figure 11:
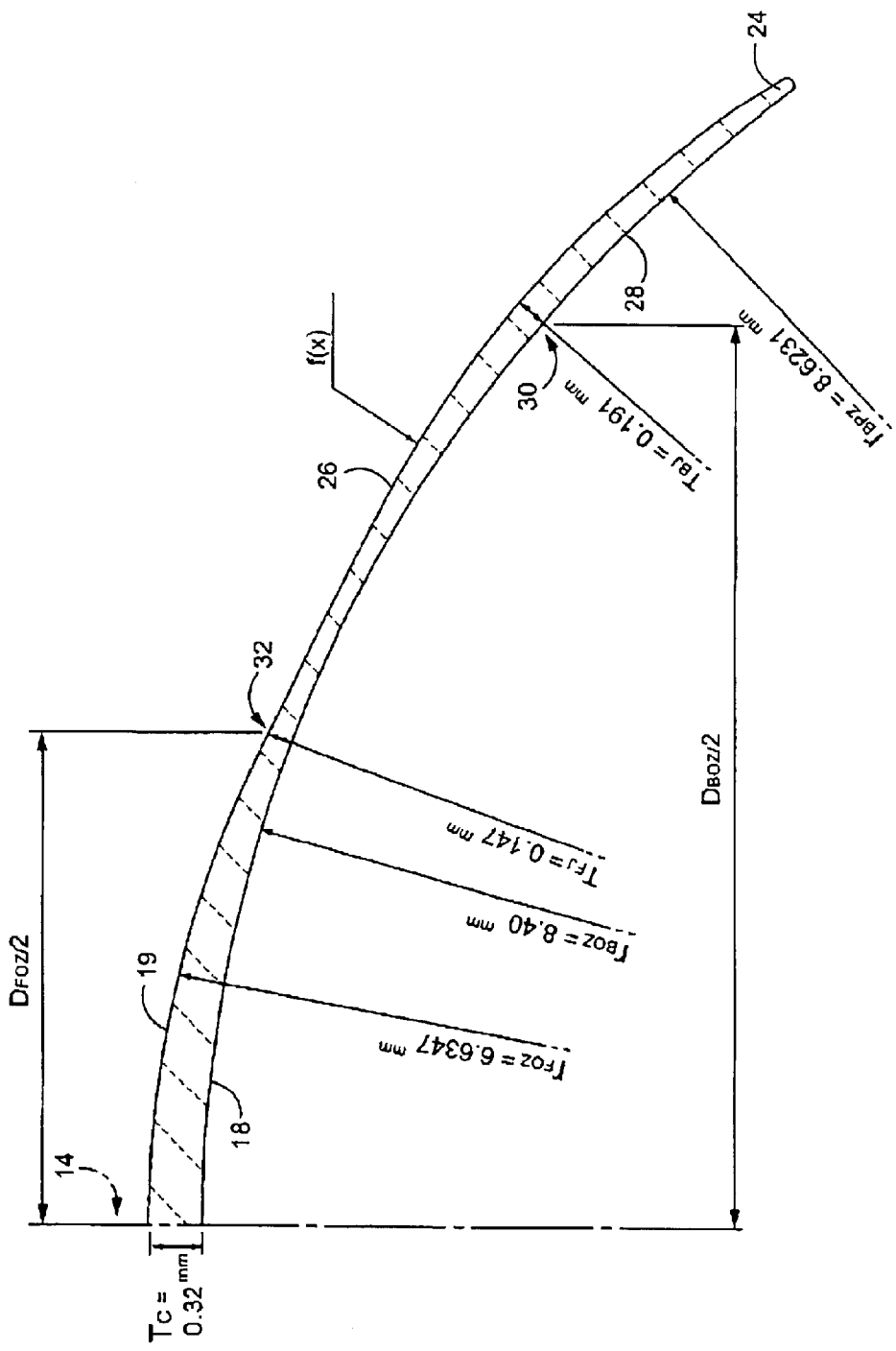
FIG. 11 is a magnified view in radial cross section of an Example 6 of the contact lens of FIG. 1.

FIG. 11 shows the contact lens of Example 6 in vertical cross section, which measures 6 mm in front optical zone diameter $D_{FOZ}$. A back optical zone 18 has an arcuate form in vertical cross section with a radius of curvature $r_{BOZ}$ of 8.40 mm. A front optical zone 19 also has an arcuate form in vertical cross section with a radius of curvature $r_{FOZ}$ of 6.6347 mm. As a result, the back and front optical zones 18, 19 cooperate with each other to provide a dioptric power P of 15.00 diopters (i.e., a positive refractive power). The contact lens has a central lens thickness $T_C$ of 0.32 mm, which is a thickness of the contact lens as measured along a center axis 14, and a front junction lens thickness $T_{FJ}$ of 0.147 mm, which is a thickness of the contact lens as measured at a front junction 32. A back peripheral zone 28 of the contact lens has an arcuate form in vertical cross section with a radius of curvature $r_{BPZ}$ of 8.6231 mm.

With the contact lens of Example 6 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 1.30 so that the contact lens of Example 6 meets the requirements represented by the following condition expression applied to contact lenses with positive refractive power and with the front optical zone diameter $D_{FOZ}$ of smaller than 7.0 mm ($D_{FOZ}$<7.0 mm):

$$1.238 \leq T_{BJ}/T_{FJ} \leq 1.470$$

According to Example 6, a form of the front peripheral zone 26 in cross section is represented by the following polynomial of third order on the condition that a surface of the front peripheral zone 26 passes through a point where a back junction 30 measures 0.191 mm in lens thickness, the peripheral zone is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
a=−2.87313×10⁻²
b=3.08024×10⁻¹
c=−1.57935
d=1.07446×10

The contact lens configured according to Example 6 meets the requirements of the present invention, and accordingly permits to be excellent in handling or differentiating between the front and back surface of the contact lens, as well as to be highly comfortable to wear.

Figure 12:
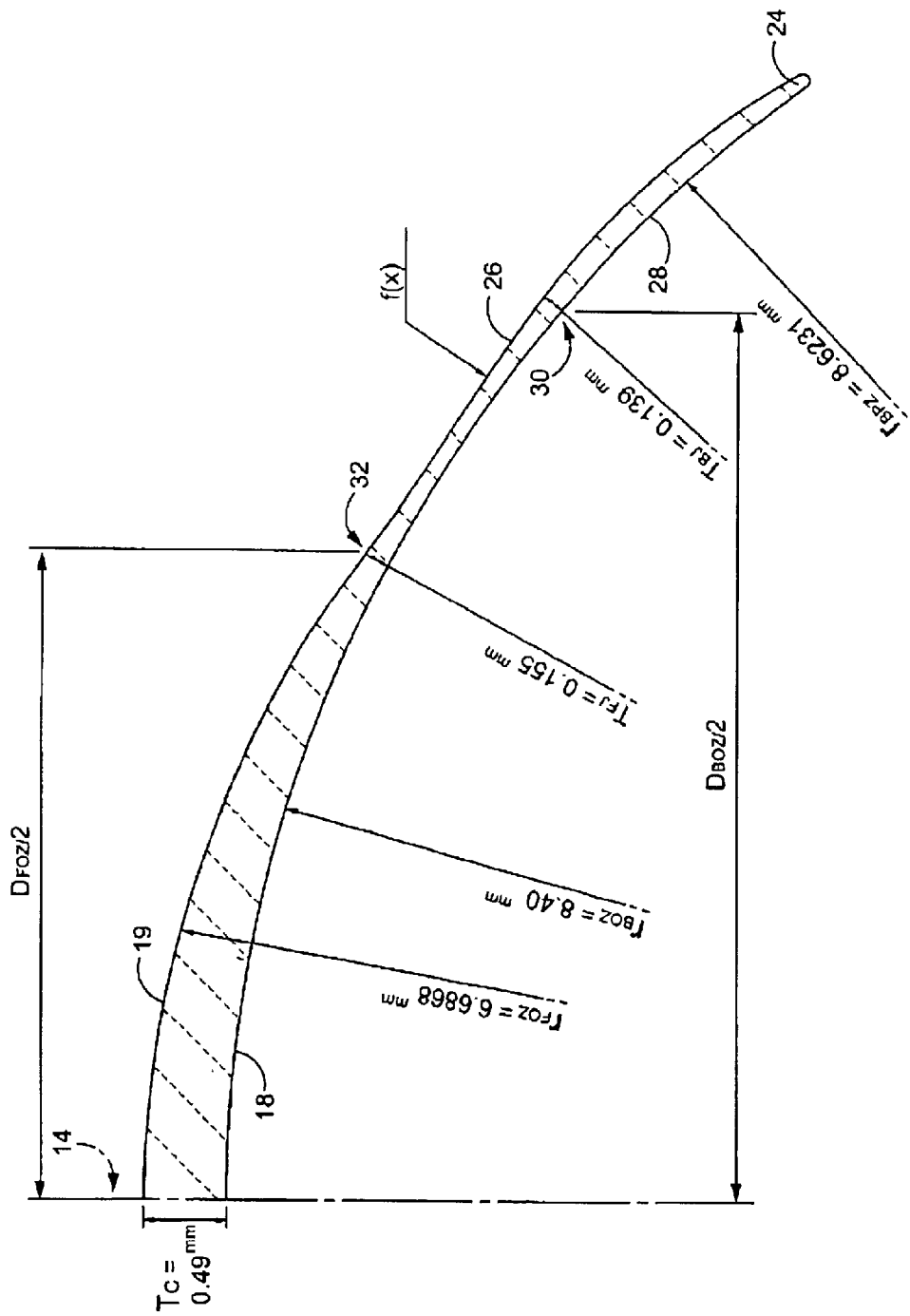
FIG. 12 is a magnified view in radial cross section of an Example 7 of the contact lens of FIG. 1.

FIG. 12 shows the contact lens of Example 7 in vertical cross section, which measures 8 mm in front optical zone diameter $D_{FOZ}$. The front optical diameter $D_{FOZ}$ of the Example 7 is made larger than that of the contact lens of the Example 6. A back optical zone 18 has an arcuate form in vertical cross section with a radius of curvature $r_{BOZ}$ of 8.40 mm. A front optical zone 19 also has an arcuate form in vertical cross section with a radius of curvature $r_{FOZ}$ of 6.6868 mm. As a result, the back and front optical zones 18, 19 cooperate with each other to provide a dioptric power P of 15.00 diopters (i.e., a positive refractive power). The contact lens has a central lens thickness $T_C$ of 0.49 mm, which is a thickness of the contact lens as measured along a center axis 14, and a front junction lens thickness $T_{FJ}$ of 0.155 mm, which is a thickness of the contact lens as measured at a front junction 32. A back peripheral zone 28 of the contact lens has an arcuate form in vertical cross section with a radius of curvature $r_{BPZ}$ of 8.6231 mm.

With the contact lens of Example 7 dimensioned as described above, a front peripheral zone 26 is shaped based on conditions for arranging the ratio $T_{BJ}/T_{FJ}$ of the back junction lens thickness $T_{BJ}$ and the front junction lens thickness $T_{FJ}$ to 0.90 so that the contact lens of Example 7 meets the requirements represented by the maximum and minimum evaluation lines in the graph of FIG. 5. According to Example 7, a form of the front peripheral zone 26 in cross section is represented by the following polynomial of third order on the condition that a surface of the front peripheral zone 26 passes through a point where a back junction 30 measures 0.139 mm in lens thickness, the peripheral zone is connected at its inner peripheral portion to the peripheral portion of the optical zone and at its outer peripheral portion to the inner peripheral portion of an edge, and the inner peripheral portion of the front peripheral zone 26 is connected to the peripheral portion of the front optical zone 19 along junctions lying on tangents common to curves of the front peripheral zone 26 and the front optical zone 19.

$$f(x)=ax^3+bx^2+cx+d$$

where,
x=distance from the center axis 14 of the lens
a=−5.35862×10⁻²
b=7.59929×10⁻¹
c=−4.25377
d=1.58474×10

The contact lens configured according to Example 7 meets the requirements of the present invention, and accordingly permits to be excellent in handling or differentiating between the front and back surface of the contact lens, as well as to be highly comfortable to wear.

As is understood from the form of the optical zone in the contact lens according to Example 6 or 7, a contact lens having a positive refractive power is generally characterized by that a lens thickness measured at a front junction where a front optical zone and a front peripheral zone join together is made larger than that measured along its optical axis. This permits the positive contact lens to have a relatively large central lens thickness $T_C$, without causing any significant problems. Since a maximum value of the central lens thickness $T_C$ is restricted by a given tolerable range of a front junction lens thickness $T_{FJ}$, it may be effective to design the central lens thickness $T_C$ of the positive contact lens to satisfy the following condition expression: 0.05 mm $\leq T_C$, for example.

What is claimed is:

1. A contact lens comprising:
    a central optical zone including a front optical zone and a back optical zone; and
    a peripheral zone surrounding the optical zone and including a front peripheral zone and a back peripheral zone,
    wherein said contact lens is provided with a dioptric power P ranging from −10 to 0 diopters (−10≤P≤0),
    wherein said front optical zone and said front peripheral zone join together at a front junction, and said back optical zone and said back peripheral zone join together at a back junction that is located outward of said front junction in a diametric direction of said contact lens orthogonal to a center axis of said contact lens, and
    wherein said contact lens has a central lens thickness $T_C$ ranging from 0.03 to 0.50 mm as measured along said center axis thereof, a front junction lens thickness $T_{FJ}$ of not less than 0.05 mm as measured at said front junction, and a back-junction lens thickness $T_{BJ}$ as measured at said back junction, said back-junction lens thickness $T_{BJ}$ is determined depending upon said dioptric power P so as to satisfy a following expression:

$$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.2382
$A_1$=−0.1741
$A_2$=−1.4711
$A_3$=−0.9355
$B_0$=+1.4699
$B_1$=−0.2523
$B_2$=−1.9897
$B_3$=−1.2603.

2. A contact lens according to claim 1, wherein said front junction has a diameter within a range of 55–85% of a diameter of said contact lens, and said back junction has a diameter within a range of 70–90% of said diameter of said contact lens.

3. A contact lens according to claim 1, wherein at least one of said front junction and said back junction is formed by a connecting surface joined to said optical zone along junctions lying on tangents common to curves of said optical zone and said connecting surface, and to said peripheral zone along junctions lying on tangents common to curves of said peripheral zone and said connecting surface, as seen in diametrical cross section, said connecting surface being a smoothly continuous surface interposed between said optical zone and said peripheral zone and lying on tangents whose slopes are continuously changed over an entire width thereof.

4. A contact lens according to claim 3, wherein said front peripheral zone has a diametrical cross sectional shape represented by at least one of a polynomial of not less than second order, a conic section and a spline curve.

5. A contact lens according to claim 4, wherein said back peripheral zone at least partially has an arcuate shape in diametrical cross section, and said contact lens comprises a soft contact lens formed of a soft material.

6. A contact lens according to claim 1, wherein said front peripheral zone has a diametrical cross sectional shape represented by at least one of a polynomial of not less than second order, a conic section and a spline curve.

7. A contact lens according to claim 1, wherein said back peripheral zone at least partially has an arcuate shape in diametrical cross section.

8. A contact lens according to claim 1, wherein said contact lens comprises a soft contact lens formed of a soft material.

9. A contact lens comprising:
    a central optical zone including a front optical zone and a back optical zone; and
    a peripheral zone surrounding said optical zone and including a front peripheral zone and a back peripheral zone,
    wherein said contact lens is provided with a dioptric power P ranging from −6 to 0 diopters (−6≤P≤0),
    wherein said front optical zone and said front peripheral zone join together at a front junction, and said back optical zone and said back peripheral zone join together at a back junction that is located outward of said front junction in a diametric direction of said contact lens orthogonal to a center axis of said contact lens, and
    wherein said contact lens has a central lens thickness $T_C$ ranging from 0.03 to 0.50 mm as measured along said center axis thereof, a front junction lens thickness $T_{FJ}$ of not less than 0.05 mm as measured at said front junction between said front optical zone and said front peripheral zone, and a back-junction lens thickness $T_{BJ}$ as measured at said back junction is determined so as to satisfy a following expression:

$$T_{BJ}/T_{FJ} \leq 1.$$

10. A contact lens according to claim 9, wherein said front junction has a diameter within a range of 55–85% of a diameter of said contact lens, and said back junction has a diameter within a range of 70–90% of said diameter of said contact lens.

11. A contact lens according to claim 9, wherein at least one of said front junction and said back junction is formed by a connecting surface joined to said optical zone along junctions lying on tangents common to curves of said optical zone and said connecting surface, and to said peripheral zone along junctions lying on tangents common to curves of said peripheral zone and said connecting surface, as seen in diametrical cross section, said connecting surface being a smoothly continuous surface interposed between said optical zone and said peripheral zone and lying on tangents whose slopes are continuously changed over an entire width thereof.

12. A contact lens according to claim 11, wherein said front peripheral zone has a diametrical cross sectional shape represented by at least one of a polynomial of not less than second order, a conic section and a spline curve.

13. A contact lens according to claim 12, wherein said back peripheral zone at least partially has an arcuate shape in diametrical cross section, and said contact lens comprises a soft contact lens formed of a soft material.

14. A contact lens according to claim 9, wherein said front peripheral zone has a diametrical cross sectional shape represented by at least one of a polynomial of not less than second order, a conic section and a spline curve.

15. A contact lens according to claim 9, wherein said back peripheral zone at least partially has an arcuate shape in diametrical cross section.

16. A contact lens according to claim 9, wherein said contact lens comprises a soft contact lens formed of a soft material.

17. A contact lens comprising:

a central optical zone including a front optical zone and a back optical zone; and a peripheral zone surrounding said optical zone and including a front peripheral zone and a back peripheral zone, wherein said contact lens is provided with a dioptric power P not larger than −10 diopters (P<−10), wherein said front optical zone and said front peripheral zone join together at a front junction, and said back optical zone and said back peripheral zone join together at a back junction that is located outward of said front junction in a diametric direction of said contact lens orthogonal to a center axis of said contact lens, and wherein said contact lens has a central lens thickness $T_C$ ranging from 0.03 to 0.50 mm as measured along said center axis thereof, a front junction lens thickness $T_{FJ}$ of not less than 0.05 mm as measured at said front junction, and a back-junction lens thickness $T_{BJ}$ as measured at said back junction, said back-junction lens thickness $T_{BJ}$ is determined depending upon said dioptric power P so as to satisfy a following expression:

(a) where said front optical zone has a diameter $D_{FOZ}$ smaller than 7.0 mm ($D_{FOZ}$<7.0 mm), $$0.877 \leq T_{BJ}/T_{FJ} \leq 0.993$$

(b) where said front optical zone has a diameter $D_{FOZ}$ of not smaller than 7.0 mm ($D_{FOZ} \geq 7.0$ mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0$=+1.7980
$A_1$=+1.4330
$A_2$=+0.5824
$A_3$=+0.0814
$B_0$=+2.0184
$B_1$=+1.5827
$B_2$=+0.6298
$B_3$=+0.0871.

18. A contact lens according to claim 17, wherein at least one of said front junction and said back junction is formed by a connecting surface joined to said optical zone along junctions lying on tangents common to curves of said optical zone and said connecting surface, and to said peripheral zone along junctions lying on tangents common to curves of said peripheral zone and said connecting surface, as seen in diametrical cross section, said connecting surface being a smoothly continuous surface interposed between said optical zone and said peripheral zone and lying on tangents whose slopes are continuously changed over an entire width thereof.

19. A contact lens according to claim 18, wherein said front peripheral zone has a diametrical cross sectional shape represented by at least one of a polynomial of not less than second order, a conic section and a spline curve.

20. A contact lens according to claim 19, wherein said back peripheral zone at least partially has an arcuate shape in diametrical cross section, and said contact lens comprises a soft contact lens formed of a soft material.

21. A contact lens according to claim 17, wherein said front peripheral zone has a diametrical cross sectional shape represented by at least one of a polynomial of not less than second order, a conic section and a spline curve.

22. A contact lens according to claim 17, wherein said back peripheral zone at least partially has an arcuate shape in diametrical cross section.

23. A contact lens according to claim 17, wherein said contact lens comprises a soft contact lens formed of a soft material.

24. A contact lens comprising:

a central optical zone including a front optical zone and a back optical zone; and a peripheral zone surrounding said optical zone and including a front peripheral zone and a back peripheral zone, wherein said contact lens is provided with a dioptric power P larger than 0 diopters (0<P), wherein said front optical zone and said front peripheral zone join together at a front junction, and said back optical zone and said back peripheral zone join together at a back junction that is located outward of said front junction in a diametric direction of said contact lens orthogonal to a center axis of said contact lens, and wherein said contact lens has a central lens thickness $T_C$ ranging from 0.03 to 0.50 mm as measured along said center axis thereof, a front junction lens thickness $T_{FJ}$ of not less than 0.05 mm as measured at said front junction, and a back-junction lens thickness $T_{BJ}$ as measured at said back junction, said back-junction lens thickness $T_{BJ}$ is determined depending upon said dioptric power P so as to satisfy a following expression:

(a) where said front optical zone has a diameter $D_{FOZ}$ smaller than 7.0 mm ($D_{FOZ}$<7.0 mm), $$1.2389 \leq T_{BJ}/T_{FJ} \leq 1.470$$

(b) where said front optical zone has a diameter $D_{FOZ}$ not smaller than 7.0 mm ($D_{FOZ} \geq 7.0$ mm), $$\Sigma(A_i \cdot 10^{-1} \cdot P^i) \leq T_{BJ}/T_{FJ} \leq \Sigma(B_i \cdot 10^{-i} \cdot P^i)$$

where,
$A_0$=+1.2066
$A_1$=−0.0398
$A_2$=−0.1341
$A_3$=+0.0139
$B_0$=+1.4328
$B_1$=−0.0516
$B_2$=−0.1436
$B_3$=+0.0153.

25. A contact lens according to claim 24, wherein at least one of said front junction and said back junction is formed by a connecting surface joined to said optical zone along junctions lying on tangents common to curves of said optical zone and said connecting surface, and to said peripheral zone along junctions lying on tangents common to curves of said peripheral zone and said connecting surface, as seen in diametrical cross section, said connecting surface being a smoothly continuous surface interposed between said optical zone and said peripheral zone and lying on tangents whose slopes are continuously changed over an entire width thereof.

26. A contact lens according to claim 25, wherein said front peripheral zone has a diametrical cross sectional shape represented by at least one of a polynomial of not less than second order, a conic section and a spline curve.

27. A contact lens according to claim 26, wherein said back peripheral zone at least partially has an arcuate shape in diametrical cross section, and said contact lens comprises a soft contact lens formed of a soft material.

28. A contact lens according to claim 24, wherein said front peripheral zone has a diametrical cross sectional shape represented by at least one of a polynomial of not less than second order, a conic section and a spline curve.

29. A contact lens according to claim 24, wherein said back peripheral zone at least partially has an arcuate shape in diametrical cross section.

30. A contact lens according to claim 24, wherein said contact lens comprises a soft contact lens formed of a soft material.

31. A method of designing a contact lens including: a central optical zone having a front optical zone and a back optical zone; and a peripheral zone surrounding said optical zone and having a front peripheral zone and a back peripheral zone, said method comprising the steps of:

positioning a back junction where said back optical zone and said back peripheral zone join together is located radially outward of a front junction where said front optical zone and said front peripheral zone join together; and adjusting a ratio $T_{BJ}/T_{FJ}$ of a back junction lens thickness $T_{BJ}$ to a front junction lens thickness $T_{FJ}$ to be held within a tolerable range predetermined depending upon a dioptric power P provided to said optical zone, wherein said tolerable range of said ratio $T_{BJ}/T_{FJ}$ of said back-junction lens thickness $T_{BJ}$ to said front-junction lens thickness $T_{FJ}$ comprises an expression requiring said ratio $T_{BJ}/T_{FJ}$ to be not smaller than 1 ($T_{BJ}/T_{FJ} \geq 1$) where said dioptric power P given to said optical zone is ranging from –6 to 0 diopters.

32. A method of designing a contact lens according to claim 31, further comprising the step of designing a form of said optical zone such that a central lens thickness measured along a center axis of said contact lens is held within a range of 0.03–0.50 mm, and a peripheral lens thickness measured at said front junction is not less than 0.05 mm.

33. A method of designing a contact lens including: a central optical zone having a front optical zone and a back optical zone; and a peripheral zone surrounding said optical zone and having a front peripheral zone and a back peripheral zone, said method comprising the steps of:

positioning a back junction where said back optical zone and said back peripheral zone join together is located radially outward of a front junction where said front optical zone and said front peripheral zone join together; and adjusting a ratio $T_{BJ}/T_{FJ}$ of a back junction lens thickness $T_{BJ}$ to a front junction lens thickness $T_{FJ}$ to be held within a tolerable range predetermined depending upon a dioptric power P provided to said optical zone, wherein said tolerable range of said ratio $T_{BJ}/T_{FJ}$ of said back-junction lens thickness $T_{BJ}$ to said front-junction lens thickness $T_{FJ}$ comprises options (a)–(c) represented by following expressions selectable depending upon said dioptric power P given to said optical zone and said diameter $D_{FOZ}$ of said optical zone:

(a) where the dioptric power P of said lens is held within range of 0 to –10($-10 \leq P \leq 0$), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0 = +1.2382$
$A_1 = -0.1741$
$A_2 = -1.4711$
$A_3 = -0.9355$
$B_0 = +1.4699$
$B_1 = -0.2523$
$B_2 = -1.9897$
$B_3 = -1.2603$ (b) where said dioptric power P of said lens is not larger than $-10 (P < -10)$, and
(1) if said diameter of said front optical zone $D_{FOZ}$ is smaller than 7.0 mm ($D_{FOZ} < 7.0$ mm), $$0.877 \leq T_{BJ}/T_{FJ} \leq 0.993$$

(2) if the diameter of said front optical zone $D_{FOZ}$ is not smaller than 7.0 mm ($D_{FOZ} \geq 7.0$ mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0 = +1.7980$
$A_1 = +1.4330$
$A_2 = +0.5824$
$A_3 = +0.0814$
$B_0 = +2.0184$
$B_1 = +1.5827$
$B_2 = +0.6298$
$B_3 = +0.0871$ (c) where said dioptric power P of said lens is larger than 0 ($P > 0$), and
(1) if said diameter of said front optical zone $D_{FOZ}$ is smaller than 7.0 mm ($D_{FOZ} < 7.0$ mm), $$1.238 \leq T_{BJ}/T_{FJ} \leq 1.470$$

(2) if said diameter of said front optical zone $D_{FOZ}$ is not smaller than 7.0 mm ($D_{FOZ} \geq 7.0$ mm), $$\Sigma(A_i \cdot 10^{-i} \cdot P^i) \leq T_{BJ}/T_{FJ} \leq \Sigma(B_i \cdot 10^{-i} \cdot P^i)$$

where,
$A_0 = +1.2066$
$A_1 = -0.0398$
$A_2 = -0.1341$
$A_3 = +0.0139$
$B_0 = +1.4328$
$B_1 = -0.0516$
$B_2 = -0.1436$
$B_3 = +0.0153$.

34. A method of designing a contact lens according to claim 33, further comprising the step of designing a form of said optical zone such that a central lens thickness measured along a center axis of said contact lens is held within a range of 0.03–0.50 mm, and a peripheral lens thickness measured at said front junction is not less than 0.05 mm.

* * * * *